United States Patent [19]

Sakashita et al.

[11] Patent Number: 5,717,057
[45] Date of Patent: Feb. 10, 1998

[54] METHOD OF MANUFACTURING POLYCARBONATE

[75] Inventors: Takeshi Sakashita, Utsunomiya; Tomoaki Shimoda, Moka; Takashi Nagai, Utsunomiya, all of Japan

[73] Assignee: General Electric Company, Pittsfield, Mass.

[21] Appl. No.: 581,639

[22] Filed: Dec. 28, 1995

[30] Foreign Application Priority Data

Dec. 28, 1994 [JP] Japan ................................. 6-327758
Dec. 28, 1994 [JP] Japan ................................. 6-327759
Dec. 28, 1994 [JP] Japan ................................. 6-327760

[51] Int. Cl.$^6$ .......................... C08G 64/40; C08G 64/00
[52] U.S. Cl. .......................... 528/198; 524/107; 524/115; 524/155; 524/158; 524/165; 524/611; 524/745; 524/746; 528/196; 528/199; 528/200; 528/487
[58] Field of Search ......................... 528/196, 198, 528/199, 487, 200; 524/107, 115, 155, 158, 165, 611, 745, 746

[56] References Cited

U.S. PATENT DOCUMENTS

| | | | |
|---|---|---|---|
| 5,151,491 | 9/1992 | Sakashita et al. | 528/199 |
| 5,276,129 | 1/1994 | Sakashita et al. | 528/198 |
| 5,306,801 | 4/1994 | Sakashita et al. | 528/198 |
| 5,371,170 | 12/1994 | Sakashita et al. | 528/198 |

FOREIGN PATENT DOCUMENTS

| | | |
|---|---|---|
| 4020523 | 5/1990 | Japan . |
| 06329786A | 5/1993 | Japan . |

*Primary Examiner*—Terressa Mosley

[57] ABSTRACT

A method for manufacturing polycarbonate in which an aromatic dihydroxy compound and a carbonic acid diester can be effectively subjected to melt polycondensation using a small amount of a catalyst, making it possible to manufacture polycarbonate having outstanding color matching, outstanding thermal stability, color-matching stability, etc., during molding, and outstanding water resistance is characterized in that when an aromatic dihydroxy compound and a carbonic acid diester are subjected to melt polycondensation in the presence of a catalyst, the catalyst is dissolved or dispersed as a catalyst solution, this catalyst solution is added to the melt polycondensation reaction system, and the aromatic dihydroxy compound and carbonic acid diester are subjected to melt polycondensation.

26 Claims, No Drawings

METHOD OF MANUFACTURING POLYCARBONATE

The present invention relates to a method for manufacturing polycarbonate, and more specifically, to a method for manufacturing polycarbonate in which polycarbonate having outstanding color matching outstanding thermal stability and color-matching stability during molding, and outstanding transparency and water resistance can be efficiently and easily manufactured.

Polycarbonate has outstanding mechanical properties such as impact resistance, it is outstanding in thermal resistance, transparency, etc., and it is widely applied in products such as various machine components, optical discs, and automobile components.

This polycarbonate has conventionally been manufactured by the method of direct reaction of an aromatic dihydroxy compound such as bisphenol with phosgene (interfacial method) or the method of an ester exchange reaction between an aromatic dihydroxy compound and a carbonic acid diester (the melt method).

Between these two methods, the melt method offers the advantage of allowing cheaper manufacturing of polycarbonate than the interfacial method. Moreover, the melt method is also preferred from the standpoint of environmental hygiene, as it does not use toxic substances such as phosgene.

Moreover, in the melt method, the polycondensation reaction between the aromatic dihydroxy compound and the carbonic acid diester is carried out over a long period at a high temperature. For this reason, the polycarbonate produced during the manufacturing process is subjected to high temperatures for long periods, causing polycarbonate to be obtained which shows yellow discoloration.

Examples of inventions which have been proposed in order to solve these problems include the method for manufacturing polycarbonate of Japanese Laid-Open Patent Application No. 90-175723, in which a nitrogen-containing basic compound and a small amount of an alkali metal or alkaline earth metal were used in combination as a catalyst, and the method of Japanese Laid-Open Patent No. 93-9285, which involved the manufacture of polycarbonate using an even smaller amount of an alkali metal or alkaline earth metal as a catalyst. Moreover, Japanese Laid-Open Patent No. 94-329786 presents a method for manufacturing polycarbonate in which an aromatic dihydroxy compound and diaryl carbonate are subjected to polycondensation in the presence of a solution or suspension composed of an alkali metal compound and/or alkaline earth metal compound and a catalyst having a boiling point of 30°–250° C. and having a dissolved oxygen concentration of 100 ppm or less.

When polycarbonate is manufactured by the melt method described above, in which small amounts of an alkali metal and/or alkaline earth metal catalyst are used as a catalyst, this allows polycarbonate to be obtained which has outstanding initial color-matching properties.

Furthermore, in Japanese Laid-Open Patent Application No. 92-20523, a method for manufacturing polycarbonate was proposed in which, after an addition compound or a mixture of said addition compound and phenols was formed from 2,2-bis(4-hydroxyphenyl)propane (bisphenol A) and phenols, this substance was used as raw material bisphenol in a polycondensation reaction. In said manufacturing method proposed in Japanese Laid-Open Patent No. 92-20523 in particular, the use of the above-mentioned bisphenol A addition compound (or mixture) makes it possible to supply high-purity bisphenol A for the polycondensation reaction, thus making it possible to manufacture polycarbonate having outstanding color-matching properties.

However, this method has the drawback that the phenols which form addition compounds during polycondensation must be removed, causing the polycondensation process to become complex. Moreover, there are also practical limitations such as the fact that the phenols which form addition compounds are readily oxidized, causing them to undergo discoloration and resulting in problems with storage, shipping, and handling, making it necessary to carry out melt polycondensation immediately after the addition compounds are formed.

Moreover, this melt method can also be expected to provide a method for manufacturing polycarbonate having even more outstanding color-matching properties.

The purpose of the present invention is to provide a method for manufacturing polycarbonate in which an aromatic dihydroxy compound and a carbonic acid diester can be efficiently subjected to melt polycondensation using a small amount of a catalyst, allowing polycarbonate to be obtained which shows outstanding color-matching properties, has outstanding retention stability during molding such as thermal stability and color-matching stability, and shows outstanding water resistance.

The method for manufacturing polycarbonate of the present invention is characterized in that when an aromatic dihydroxy compound and a carbonic acid diester are subjected to melt polycondensation in the presence of a catalyst, the catalyst is used in the form of a catalyst solution dissolved or dispersed in the carbonic acid diester, this catalyst solution is added to the melt polycondensation reaction system, and the aromatic dihydroxy compound and carbonic acid diester are subjected to melt polycondensation.

As the method for manufacturing polycarbonate according to the present invention uses a solution or suspension of a carbonic acid diester which can easily be dissolved in the polycondensation reaction system as a catalyst, this makes it possible to rapidly and uniformly disperse the catalyst in the reaction system and to carry out the melt polycondensation reaction in a stable manner from the initial stages of the reaction. Accordingly, this makes it possible to prevent the production of colorants as byproducts due to the presence of the catalyst in uneven amounts, thus allowing the manufacture of polycarbonate with outstanding color-matching properties.

In another aspect of the present invention, the method for manufacturing polycarbonate of the present invention is characterized in that when an aromatic dihydroxy compound and a carbonic acid diester are subjected to melt polycondensation in the presence of a catalyst, an addition compound or a mixture of said addition compound and an aromatic hydroxy compound is formed from an aromatic dihydroxy compound and an aromatic monohydroxy compound, and after (a) an alkali metal compound and/or alkaline earth metal compound is added as a catalyst in a catalytic amount to the addition compound or mixture and dispersed or dissolved, the aromatic monohydroxy compound is removed from the addition compound or mixture, the aromatic dihydroxy compound obtained is subjected to a melt polycondensation reaction, and in the presence of (a) the alkali metal compound and/or alkaline earth metal compound contained in said aromatic dihydroxy compound, the aromatic dihydroxy compound and the carbonic acid diester are subjected to melt polycondensation.

In still another aspect of the present invention, the method for manufacturing polycarbonate of the present invention is characterized in that when an aromatic dihydroxy compound and a carbonic acid diester are subjected to melt polycondensation in the presence of a catalyst including (a) a nitrogen-containing basic compound, the aforementioned (a) nitrogen-containing basic compound is dissolved or dispersed in a monohydroxy compound or an aqueous solution of a monohydroxy compound to make a catalyst solution, this catalyst solution is added to the melt polycondensation reaction system, and the aromatic dihydroxy compound and the carbonic acid diester are subjected to melt polycondensation.

In the present invention, the carbonic acid diester which forms the aforementioned catalyst solution should preferably be the raw material carbonic acid diester used in the polycondensation reaction, and the catalyst should preferably be dissolved or dispersed in the raw material carbonic acid diester. Moreover, this carbonic acid diester should preferably be an aromatic carbonic acid diester, with phenyl carbonate being particularly preferred.

In the present invention, (a) an alkali metal compound and/or alkaline earth metal compound and/or (b) a nitrogen-containing basic compound should preferably be used as the polycondensation catalyst.

In the present invention, it is still more preferable to use a combination of (a) an alkali metal compound and/or alkaline earth metal compound and (b) a nitrogen-containing basic compound as the polycondensation catalyst.

Moreover, in the method for manufacturing polycarbonate of the present invention, when (a) an alkali metal compound and/or alkaline earth metal compound is used as the catalyst, following melt polycondensation, when the [A] polycarbonate which is a reaction product is in a molten state, one should preferably add [B] a sulfur-containing acidic compound having a pKa value of 3 or less and/or a derivative formed from said acidic compound in an amount greater by a molar factor of 1–20 than the catalytic amount of (a) the alkali metal compound and/or alkaline earth metal compound, [C] water should preferably be added as needed in the amount of 5–1,000 ppm with respect to the polycarbonate, and the mixture should then be kneaded.

In the present invention, it is preferable to use a monohydroxy compound produced as a by-product of a polycondensation reaction between an aromatic dihydroxy compound and a carbonic acid diester as the monohydroxy compound which forms the aforementioned catalyst solution, and it is particularly preferable if the aromatic monohydroxy compound is a phenol.

The aforementioned (a) nitrogen-containing basic compound may be used in the mount of $1 \times 10^{-6}$ to $1 \times 10^{-1}$ moles with respect to 1 mole of the aromatic dihydroxy compound.

The following is a specific explanation of the method for manufacturing polycarbonate of the present invention.

In the method for manufacturing polycarbonate of the present invention, polycarbonate is manufactured by subjecting an aromatic dihydroxy compound and a carbonic acid diester to melt polycondensation in the presence of a catalyst.

In the present invention, this catalyst is used in the form of a catalyst solution obtained by dissolution or dispersion in the carbonic acid diester, this catalyst solution is added to the melt polycondensation reaction system, and melt polycondensation of the aromatic dihydroxy compound and the carbonic acid diester is carried out.

The various components and catalysts used in the invention will first be explained.

Aromatic Dihydroxy Compounds

There are no particular restrictions on the aromatic dihydroxy compound used in the present invention, and an example is shown in Fig. [I] below.

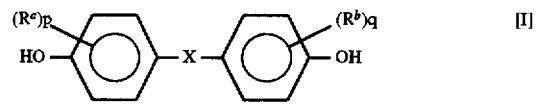

(In the formula, $R^a$ and $R^b$ are halogen atoms or monovalent hydrocarbon groups, and these may be identical or different. p and q are integers from 0–4.

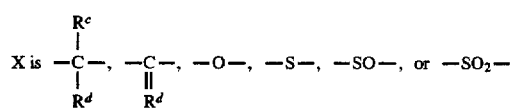

$R^c$ and $R^d$ are hydrogen atoms or monovalent hydrocarbon groups, and $R^e$ is a bivalent hydrocarbon group.)

Specific examples of the aromatic dihydroxy compound shown in Formula [1] include a bis(hydroxyaryl)alkane such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, or 2,2-bis(4-hydroxy-3-bromophenyl)propane;

a bis(hydroxyaryl)cycloalkane such as 1,1-bis(4-hydroxyphenyl)cyclopentane or 1,1-bis(4-hydroxyphenyl)cyclohexane;

a dihydroxyaryl ether such as 4,4'-dihydroxydiphenyl ether or 4,4'-dihydroxy-3,3'-dimethylphenyl ether;

a dihydroxydiaryl sulfide such as 4,4'-dihydroxydiphenyl sulfide or 4,4'-dihydroxy-3,3'-dimethylphenyl sulfide;

a dihydroxydiaryl sulfoxide such as 4,4'-dihydroxydiphenyl sulfoxide or 4,4'-dihydroxy-3,3'-dimethyldiphenyl sulfoxide;

or a dihydroxydiaryl sulfone such as 4,4'-dihydroxydiphenyl sulfone or 4,4'-dihydroxy-3,3'-dimethyldiphenyl sulfone.

Among these compounds, the use of 2,2-bis(4-hydroxyphenyl)propane (bisphenol A) is particularly preferred.

Moreover, the compound shown in Formula [II] below may also be used as the aromatic dihydroxy compound.

(Where $R^f$ is a halogen atom or a hydrocarbon group or halogen-substituted hydrocarbon group having a 1–10 carbon atoms and n is an integer from 0 to 4. When n is 2 or above, R' may be either identical or different.)

Specific examples of the aromatic dihydroxy compound shown in Formula [II] include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, or 2,3,4,6-tetrabromoresorcinol;

catechol;

or a hydroquinone or a substituted hydroquinone such as 3-methylhydroquinone, 3'-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, or 2,3,5,6-tetrabromohydroquinone.

Moreover, in the present invention, the 2,2,2',2'-tetrahydro-3,3,3',3'-tetramethyl-1,1'-spirobi[1H-indene]-6,6'-diol shown in the following formula may also be used as the aromatic dihydroxy compound.

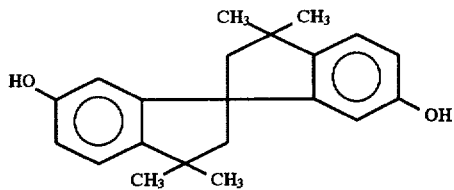

The aforementioned aromatic dihydroxy compound may also be a combination of 2 or more substances.

Carbonic Acid Diesters

Moreover, specific examples of the carbonic acid diester include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate.

Of these substances, diphenyl carbonate should preferably be used.

These carbonic acid diesters may be used individually or in combination.

The carbonic acid diester used in the present invention should preferably contain a dicarboxylic acid or dicarboxylic acid ester. Specifically, the carbonic acid diester should preferably contain 50 mole % or less of dicarboxylic acid or dicarboxylic acid ester, with a content of 30 mole % or less being particularly preferable.

Examples of this dicarboxylic acid or dicarboxylic acid ester include aromatic carboxylic acids such as terephthalic acid, isophthalic acid, diphenyl terephthalate, or diphenyl isophthalate;

aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, or diphenyl dodecanedioate;

and aliphatic dicarboxylic acids such as dichloropropanedicarboxylic acid, 1,2-cyclopropanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, or diphenyl 1,4-cyclohexanedicarboxylate.

The carbonic acid diester may contain 2 or more of these dicarboxylic acids or dicarboxylic acid esters.

In the present invention, in polycondensation of the carbonic acid diester and aromatic dihydroxy compound as described above, one should ordinarily use 1.0–1.30 moles of the carbonic acid diester for each mole of the aromatic dihydroxy compound, with an amount of 1.01–1.20 moles being particularly preferred.

Moreover, in manufacturing polycarbonate by the method of the present invention, together with the aforementioned aromatic dihydroxy compound and carbonic acid diester, a multifunctional compound having three or more functional groups per molecule may also be used.

A compound having a phenolic hydroxyl group or a carboxyl group should preferably be used as this multifunctional compound, with compounds containing three phenolic hydroxyl groups being particularly preferred. Specific examples of this multifunctional compound include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, phloroglucinol, 4,6-dimethyl-2,4,6-tris(4-hydroxyphenyl)heptane-2 [sic], 1,3,5-tris(4-hydroxyphenyl)benzene, 2,2-bis[4,4-(4,4'-dihydroxyphenyl)cyclohexyl]propane, trimellitic acid, 1,3,5-benzenetricarboxylic acid, and pyromellitic acid.

Of these compounds, the use of 1,1,1-tris(4-hydroxyphenyl)ethane or α,α'-α"-tris(4-hydroxyphenyl)-1,3,5-triisopropylbenzene, etc., is particularly preferred.

This type of multifunctional compound should preferably be present in the amount of 0.03 moles or less with respect to 1 mole of the aromatic dihydroxy compound, and more preferably in the amount of 0.001–0.02 moles, with 0.001–0.01 moles being particularly preferred.

In manufacturing the polycarbonate, the aforementioned aromatic dihydroxy compound and the carbonic acid diester may be used in a solid state, or they may be subjected to the reaction in a molten state directly from the manufacturing device.

Catalysts

In the present invention, a basic catalyst or an acidic catalyst may be used as the polycondensation catalyst.

Examples of basic catalysts include (a) alkali metal compounds and/or alkaline earth metal compounds (referred to in the following simply as (a) alkali compounds), (b) nitrogen-containing basic compounds, etc.

Specific examples of the preferred (a) alkali compound include organic acid salts, inorganic acid salts, oxides, hydroxides, hydrides, and alcoholates of alkali metals and alkaline earth metals.

More specifically, examples of the alkali metal compound include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium hydroxyborate, lithium hydroxyborate, sodium phenyl borate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, etc.

Furthermore, specific examples of the alkaline earth metal compound include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

These substances may be used in combinations of 2 or more.

In the present invention, the (a) alkali compound should preferably be used in the amount of $5 \times 10^{-8}$ to $2 \times 10^{-6}$ moles for each mole of the aforementioned aromatic dihydroxy compound, or more preferably $1 \times 10^{-7}$ to $1.5 \times 10^{-6}$ moles, with the amount of $1 \times 10^{-7}$ to $1.2 \times 10^{-6}$ moles being particularly preferred. This value should preferably be the amount of the (a) alkali compound present in the polycondensation reaction system.

Specifically, minute or trace amounts of the (a) alkali compound are present in the raw materials as impurities, and in such cases, the total amount of the (a) alkali compound added as a catalyst and the (a) alkali compound present in the raw materials as an impurity should preferably be the amount specified above.

However, as the amount of the (a) alkali compound present in the raw materials as an impurity varies depending on the raw material used, in order to accurately control the amount of the (a) alkali compound present in the reaction system, it is preferred to purify the raw materials used in order to minimize the amount of the (a) alkali compound present in the raw material. For example, the raw material should preferably be purified in such a manner that the amount of the (a) alkali compound present in the various components of the raw material is 1 ppb or less as calculated by metal conversion.

For example, one may use a nitrogen-containing basic compound which decomposes readily or is volatile at high temperatures as this (b) nitrogen-containing basic compound, with specific examples including the following compounds:

Ammonium hydroxides having alkyl, aryl, and aralkyl groups, such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($\phi$-$CH_2(Me)_3NOH$), etc., tertiary amines such as trimethylamine, triethylamine, dimethylbenzylamine, and triphenylamine, secondary amines indicated by the formula $R_2NH$ (in the formula, R indicates an alkyl group such as methyl or ethyl or an aryl group such as phenyl or tolyl), primary amines indicated by the formula $RNH_2$ (in the formula, R has the same meaning as indicated above), pyridines such as 4-dimethylaminopyridine, 4-diethylaminopyridine, and 4-pyrrolidinopyridine, imidazoles such as 2-methylimidazole and 2-phenylimidazole, or basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$), and tetramethylammonium tetraphenylborate ($Me_4NBPh_4$).

Of these substances, tetraalkylammonium hydroxides, particularly tetraalkylammonium hydroxides for electronic use which have a low content of metal impurities, are particularly preferable.

The aforementioned (b) nitrogen-containing basic compound should be included in the amount of $10^{-6}$ to $10^{-1}$ moles, or preferably $10^{-5}$ to $10^{-2}$ moles, with respect to 1 mole of the aromatic dihydroxy compound.

In the present invention, (a) an alkali compound or (b) a nitrogen-containing basic compound alone may be used as the aforementioned basic catalyst, or this (a) alkali compound and (b) nitrogen-containing basic compound may be used in combination. Among these possibilities, a combination of (a) an alkali compound and (b) a nitrogen-containing basic compound should preferably be used.

When (a) the alkali compound and (b) the nitrogen-containing basic compound are used in the aforementioned amounts as a catalyst, it becomes possible to carry out the polycondensation reaction at a sufficient rate and to produce high-molecular-weight polycarbonate having a high degree of polymerization.

Moreover, in the present invention, a combination of the above-mentioned (a) alkali compound and/or (b) nitrogen-containing basic compound and (c) a boric acid compound may also be used as the polycondensation catalyst.

Examples of this type of (c) boric acid compound include boric acid and boric acid esters.

As an example of a boric acid ester, one can mention a boric acid ester having the following general formula.

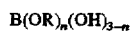

In the formula, R indicates an alkyl group such as methyl or ethyl or an aryl group such as phenyl, and n is the integer 1, 2, or 3.

Specific examples of this boric acid ester include trimethyl borate, triethyl borate, tributyl borate, trihexyl borate, triheptyl borate, triphenyl borate, tritolyl borate, and trinaphthyl borate.

This (c) boric acid or boric acid ester should be used in the amount of $10^{-8}$ to $10^{-1}$ moles, and preferably $10^{-7}$ to $10^{-2}$ moles, with respect to 1 mole of the aromatic dihydroxy compound, with the amount of $10^{-6}$ to $10^{-4}$ moles being particularly preferred.

Moreover, examples of the acidic catalysts used in the present invention include Lewis acid compounds such as the following:

zinc compounds such as zinc borate, zinc acetate, zinc oxalate, zinc phenylacetate, zinc chloride, zinc sulfate, zinc nitrate, zinc carbonate, zinc oxide, zinc hydroxide, zinc stearate, zinc-chromium oxide, and zinc-chromium-copper oxide, cadmium compounds such as cadmium acetate, cadmium oxalate, cadmium oxide, and cadmium stearate, silicon compounds such as silicon oxide, silica alumina, and silica magnesia, germanium compounds such as germanium oxide and germanium hydroxide, tin compounds such as stannous acetate, stannous oxalate, tin octylate, stannous chloride, stannic chloride, stannous oxide, stannic oxide, and tetraphenyltin, lead compounds such as lead acetate, lead borate, lead citrate, lead hydroxide, lead oxide, lead phosphates, lead phthalate, and lead stearate, antimony compounds such as antimony acetate, antimony oxalate, triphenylantimony, antimony trioxide, antimony pentoxide, triphenoxyantimony, trimethoxyantimony, and antimony trichloride, bismuth compounds such as bismuth acetate, bismuth oxalate, triphenylbismuth, bismuth trioxide, and bismuth trichloride, and titanium compounds such as titanium trichloride, titanium tetrachloride, titanium dioxide, tetraphenoxytitanium, and tetraisopropoxytitanium.

In the present invention, this type of acidic catalyst may be used alone as the polycondensation catalyst, or a combination of (a), (b), and (c), etc., may be used as a catalyst as described above.

Of these substances, a basic catalyst should preferably be used in the present invention, with the aforementioned combination of (a) an alkali compound and (b) a nitrogen-containing basic compound being particularly preferred.

In the present invention, the aforementioned aromatic dihydroxy compound and carbonic acid diester are subjected to melt polycondensation in the presence of a catalyst, but in this case, the catalyst is used in the form of a catalyst solution dissolved or dispersed in carbonic acid diester, and this catalyst solution is added to the melt polycondensation reaction system.

Examples of this type of carbonic acid diester include alkyl carbonic acid diesters and aromatic carbonic acid diesters, and as a specific example, one can cite substances which are the same as the carbonic acid diester used as a raw material in the above-mentioned reaction. Among these substances, aromatic carbonic acid diesters are preferred, with diphenyl carbonate being particularly preferred.

Moreover, this carbonic acid diester should preferably be of the same type as the raw material carbonic acid diester used in the polycondensation reaction, and it should preferably be the raw material carbonic acid diester itself. When the carbonic acid diester which forms the catalyst solution and the raw material carbonic acid diester used in the polycondensation reaction are identical, compatibility is increased between the catalyst solution and the mixed solution composed of the aromatic dihydroxy compound and the carbonic acid diester, making effective dispersion of the catalyst in the reaction system possible and making it possible to simplify the process of recovery of unreacted monomers, etc.

Moreover, the boiling point of the carbonic acid diester which forms the catalyst solution at ordinary pressure should preferably be equal to or greater than the temperature of the polycondensation reaction of the aromatic dihydroxy compound and the carbonic acid diester.

There are no particularly restrictions on the amount of the aforementioned carbonic acid diester used with respect to the catalyst, provided that the amount used does not block the polycondensation reaction, but an amount of 0.5–10,000 moles with respect to 1 mole of the catalyst is preferred, with an amount of 1–5,000 moles being particularly preferable.

In the present invention, at least a portion of the catalyst used in the polycondensation reaction should be dissolved or dispersed in this carbonic acid diester.

FIGS. 1, 2 and 3 show process flow diagrams with different examples of catalyst addition method.

In addition method 1, the catalyst is dissolved or dispersed in a carbonic acid diester which differs from the raw material carbonic acid diester and added to the reaction system.

In addition method 2, the catalyst is dissolved or dispersed in a carbonic acid diester of the same type as the raw material carbonic acid diester and added to the reaction system.

In addition method 3, the catalyst is dissolved or dispersed in the raw material carbonic acid diester in advance and added to the reaction system.

In the present invention, when a combination of (a) an alkali compound and (b) a nitrogen-containing basic compound is used as the catalyst, (a) and (b) may be dissolved or dispersed in the carbonic acid diester after being mixed in advance, (a) and (b) may be individually dissolved or dispersed in the carbonic acid diester and used separately, or separately dissolved or dispersed catalyst solutions may be mixed and then used.

Moreover, in addition method 4, (a) the alkali compound alone is dissolved or dispersed in the raw material carbonic acid diester and added to the reaction system, and together with this, (b) the nitrogen-containing basic catalyst may be directly added to the reaction system.

Of these methods, addition methods 3 and 4 should preferably be used.

When the catalyst is used in the form of a catalyst solution in a carbonic acid diester in this manner, the catalyst solution is rapidly dispersed in the polycondensation reaction system. Accordingly, compared to conventional methods in which a catalyst is directly added to the polycondensation reaction system of the aromatic dihydroxy compound and the carbonic acid diester or dissolved or dispersed in water or another solvent before being added, the occurrence of side reactions which cause discoloration is prevented from the initial stages of the melt polycondensation reaction, making it possible to obtain polycarbonate which has outstanding initial color tone immediately after polycondensation.

In the present invention, the aromatic dihydroxy compound and the carbonic acid diester are subjected to melt polycondensation in the presence of a catalyst as described above.

In the presence of this catalyst, the melt polycondensation reaction between the aromatic dihydroxy compound and the carbonic acid diester may be carried out under conditions identical to those conventionally known for polycondensation reactions.

Specifically, the first stage reaction of the aromatic dihydroxy compound and the carbonic acid diester should be carried out at a temperature of 80°–250° C., and preferably 100°–230° C., with a temperature of 120°–190° C. being particularly preferable. It should be carried out for a period of 0–5 hours, and preferably 0–4 hours, with a period of 0.25–3 hours being particularly preferred, and should be carried out at constant pressure. Next, keeping the reaction system at reduced pressure, the reaction temperature is increased and the reaction between the aromatic dihydroxy compound and the carbonic acid diester is carried out. Finally, the polycondensation reaction between the aromatic hydroxy compound and the carbonic acid diester should preferably be carried out at a pressure of 5 mmHg or less and a temperature of 240°–320° C.

In the process of the polycondensation reaction described above, the carbonic acid diester which differs from the raw material used as a catalyst solution is removed from the reaction system together with reaction by products.

In the present invention, as shown in the above-mentioned Addition Methods 1 and 2, in cases where the catalyst is used in the form of a catalyst solution of a carbonic acid diester other than the raw material, it may be added at any desired stage of this polycondensation reaction.

The aforementioned polycondensation reaction may be carried out either continuously or by the batch method. Moreover, the reaction device used in conducting the aforementioned reaction may be of the tank, tube, or tower type.

The intrinsic viscosity of the polycarbonate obtained as a byproduct as described above is ordinarily 0.10–1.0 dl/g as measured in methylene chloride at 20° C., with viscosity of 0.30–0.65 dl/g being preferred.

The polycarbonate obtained as a reaction byproduct as described above (referred to in the following as polycarbonate [A]) shows outstanding initial color matching.

In the present invention, in cases where (a) an alkali compound is used as the catalyst, the [B] sulfur-containing acid compound having a pKa value of 3 or less described below and/or a derivative formed from said acidic compound (also referred to below as [B] the acidic compound) should preferably be added immediately after the polycondensation reaction, without cooling [A] the polycarbonate obtained in polycondensation as a reaction product.

Moreover, [B] the acidic compound should preferably be added together with [C] water.

In the present invention, examples of [B] the sulfur-containing acidic compound or the derivative formed from said acidic compound include sulfurous acid, sulfuric acid, sulfinic acid-class compounds, sulfonic acid compounds, and their derivatives.

Specific examples of sulfurous acid derivatives include dimethyl sulfite, diethyl sulfite, dipropyl sulfite, dibutyl sulfite, and diphenyl sulfite.

Specific examples of sulfuric acid derivatives include dimethyl sulfate, diethyl sulfate, dipropyl sulfate, dibutyl sulfate, and diphenyl sulfate; and Examples of sulfinic acid-class compounds include benzenesulfinic acid, toluenesulfinic acid, and naphthalenesulfinic acid.

Moreover, an example of the sulfonic acid-class compound or its derivative is the compound shown in Formula III below or an ammonium salt thereof.

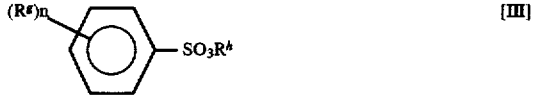

In the formula, $R^g$ is a hydrocarbon group or halogen-substituted hydrocarbon group having 1–50 carbon atoms, $R^h$ is a hydrogen atom or a hydrocarbon group or halogen-substituted hydrocarbon group having 1–50 carbon atoms, and n is an integer from 0–3.

Examples of this sulfonic acid-class compound or derivative thereof include:

sulfonates such as benzenesulfonate and p-toluenesulfonate, sulfonic acid esters such as methyl benzenesulfonate, ethyl benzenesulfonate, butyl benzenesulfonate, octyl benzenesulfonate, and phenyl benzenesulfonate, sulfonic acid esters such as methyl p-toluenesulfonate, ethyl p-toluenesulfonate, butyl p-toluenesulfonate, octyl p-toluenesulfonate, and phenyl p-toluenesulfonate, and sulfonic acid ammonium salts such as ammonium p-toluenesulfonate.

Moreover, sulfonic acid compounds such as trifluoromethanesulfonic acid, naphthalenesulfonic acid, sulfonated polystyrene, and methyl acrylate-sulfonated styrene copolymer may also be used.

These substances may also be used in combinations of two or more.

In the present invention, one should preferably use the sulfonic acid-class compound shown in Formula [III] above or a derivative thereof as [B] the acidic compound.

In particular, one should preferably use an ester compound in which, in Formula III above, $R^g$ indicates a substituted aliphatic hydrocarbon group having 1–6 carbon atoms, $R^h$ indicates a substituted aliphatic hydrocarbon group having 1–8 carbon atoms, and n indicates an integer from 0–3. Specific preferred examples include ethyl benzenesulfonate, butyl benzenesulfonate, methyl p-toluenesulfonate, ethyl p-toluenesulfonate, and butyl p-toluenesulfonate.

Among these substances, methyl p-toluenesulfonate, ethyl p-toluenesulfonate, and butyl p-toluenesulfonate are particularly preferred.

These acidic compounds [B] may be used in combinations of two or more.

In the present invention, the aforementioned [B] acidic compound should be used in an amount greater by a molar factor of 1–20 than the amount of the (a) alkali compound used in the reaction of the aforementioned [A] polycarbonate, and preferably greater by a molar factor of 1–10, with a molar factor of 1–8 being particularly preferred.

By adding the acidic compound [B] to the reaction product (polycarbonate) [A] in the above amounts, the alkali metal compound remaining in the polycarbonate is neutralized or weakened, making it possible to obtain polycarbonate in which final retention stability and water resistance are further improved.

Moreover, in the present invention, it is preferable to add the aforementioned [B] acidic compound together with [C] water in the amount of 5–1,000 ppm with respect to the polycarbonate [A], or preferably 10–500 ppm, with the amount of 20–300 ppm being particularly preferred.

When [C] water is added together with [B] the acidic compound to [A] the polycarbonate manufactured using (a) an alkali compound in this manner, the neutralization efficacy of the [B] acidic compound which acts as a basic catalyst in [A] the polycarbonate is increased, making it possible to obtain polycarbonate which shows outstanding retention stability during melting and also has outstanding color matching, transparency, water resistance, and weather resistance properties.

Moreover, when more than 1,000 ppm of water is added, the polycarbonate becomes susceptible to hydrolysis, causing deterioration of the physical properties of the polycarbonate. In the present invention, the polycarbonate should preferably be obtained by adding the aforementioned [B] acidic compound and a small amount of [C] water to the [A] polycarbonate which is the reaction product and then kneading the mixture.

Kneading of the [A] polycarbonate, the [B] acidic compound; and [C] the water can be carried out using an ordinary kneading device such as a monoaxial extruder, a biaxial extruder, or a static mixer, and these mixing devices may be effectively used whether or not they are equipped with vents.

Specifically, the [B] acidic compound and [C] water should preferably be added while the [A] polycarbonate obtained by polycondensation is in the reactor or extruder in a molten state. The [B] acidic compound and [C] water may be added either separately or at the same time, and there are no restrictions on the order in which they are added, but simultaneous addition is preferred.

More specifically, in manufacturing polycarbonate from [A] polycarbonate, [B] an acidic compound, and [C] water, for example, after forming the polycarbonate by adding [B] the acidic compound and [C] water to the [A] polycarbonate obtained from the polycondensation reaction in the reactor, one may pelletize the polycarbonate using an extruder, and while the [A] polycarbonate obtained from the polycondensation reaction is passing from the reactor through the extruder and being pelletized, one may add [B] the acidic compound and [C] water and knead this mixture to obtain the polycarbonate.

Generally speaking, in using polycarbonate, polycarbonate pellets are re-melted and various additives such as thermal stabilizers are blended in. In the polycarbonate pellets obtained in the present invention, when the various additives are blended in, or even when melting is carried out during molding, as thermal stability is improved and retention stability during melting is outstanding, thermal decomposition due to melting in particular is inhibited, making the material resistant to decreases in molecular weight and discoloration.

Moreover, in the present invention, [D] an additive may also be added to the polycarbonate [A], provided this does not have an adverse effect on the purpose of the invention.

This [D] additive should preferably be added to the [A] polycarbonate which is in a molten state at the same time as [B] the acidic compound and [C] the water.

The [B] acidic compound and [C] water may be added to the polycarbonate [A] at the same time as [D] the additive, or the various components may be added separately. Moreover, among the [D] additives presented below, reactive additives should preferably be added after adding [B] the acidic compound and [C] water.

Generally speaking, a wide range of additives may be used in the present invention as additive [D] according to the desired purpose of use, with examples including thermal stabilizers, epoxy compounds, ultraviolet absorbers, mold-releasing agents, colorants, anti-static agents, slipping agents, antiblocking agents, lubricants, defogging agents, natural oils, synthetic oils, wax, organic fillers, and inorganic fillers.

Of these substances, one should preferably use substances such as the thermal stabilizers, epoxy compounds, ultraviolet light absorbers, mold-releasing agents, and colorants presented below. These substances may also be used in combinations of two or more.

Specific examples of the thermal stabilizer used in the present invention include phosphorus compounds, phenol-class stabilizers, organic thioether-class stabilizers, and hindered amine stabilizers.

Examples of the phosphorus compound which may be used include phosphoric acid, phosphorous acid, hypophosphorous acid, pyrophosphoric acid, polyphosphoric acid, phosphoric esters, and phosphorous esters.

Examples of these phosphoric esters include trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl) phosphate, tricycloalkyl phosphates such as tricyclohexyl phosphate, and triaryl phosphates such as triphenyl phosphate, tricresyl phosphate, tris(nonylphenyl) phosphate, and 2-ethylphenyl diphenyl phosphate.

Moreover, an example of the phosphorous ester is a compound having the following general formula.

P(OR)₃

(where R indicates an alicyclic hydrocarbon group, an aliphatic hydrocarbon group, or an aromatic hydrocarbon group. These may be either identical or different.)

Examples of the compound indicated by this formula include:

trialkyl phosphites such as trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, and tris(2,3-dichloropropyl) phosphite, tricycloalkyl phosphites such as tricyclohexyl phosphite, triaryl phosphites such as triphenyl phosphite, tricresyl phosphite, tris(ethylphenyl) phosphite, tris(2,4-di-t-butylphenyl) phosphite, tris(nonylphenyl) phosphite, and tris(hydroxyphenyl) phosphite, and aryl alkyl phosphites such as phenyl didecyl phosphite, diphenyl decyl phosphite, diphenyl isooctyl phosphite, phenyl isooctyl phosphite, and 2-ethylhexyl diphenyl phosphite.

Moreover, examples of the phosphorous ester include distearyl pentaerythrityl diphosphite and bis(2,4-di-t-butylphenyl) pentaerythritol diphosphite.

These compounds may also be used in combinations of 2 or more.

Among these substances, a phosphorous ester having the above-mentioned formula is preferred for use, with aromatic phosphorous ester being preferred, and tris(2,4-di-t-butylphenyl) phosphite being particularly preferred.

Examples of phenolic stabilizers include n-octadecyl 3-(4-hydroxy-3',5'-di-t-butylphenyl)propionate, tetrakis [methylene-3-(3',5'-di-t-butyl-4-hydroxyphenyl) propionate]methane [sic], 1,1,3-tris(2-ethyl-4-hydroxy-5-t-butylphenyl)butane, distearyl (4-hydroxy-3-methyl-5-t-butyl)benzylmalonate, and 4-hydroxymethyl-2,6-di-t-butylphenol.

Examples of thioether stabilizers include dilauryl thiodipropionate, distearyl thiodipropionate, dimyristyl 3,3'-thiodipropionate, ditridecyl 3,3'-thiodipropionate, and pentaerythritol tetrakis(beta-laurylthiopropionate).

Examples of the hindered amine stabilizer include bis(2,2,6,6-tetramethyl-4-piperidyl)sebacate, bis(1,2,2,6,6-pentamethyl-4-piperidyl) sebacate, 1-[2-{3-(3,5-di-t-butyl-4-hydroxyphenyl)propionyloxy}ethyl]-4-{3-(3,5-di-t-but yl-4-hydroxyphenyl) propionyloxy}-2,2,6,6-tetramethylpiperidyl sebacate, 8-benzyl-7,7,9,9-tetramethyl-3-octyl-1,2,3-triazaspiro[4,5]undecane-2,4-dione, 4-benzoyloxy-2,2,6,6- tetramethylpiperazine, bis(1,2,2,6,6-pentamethyl-4-piperidyl) 2-(3,5-di-t-butyl-4-hydroxybenzyl)-2-n-butylmalonate, and tetrakis(2,2,6,6-tetramethyl-4-piperidyl) 1,2,3,4-butanetetracarboxylate.

These compounds may also be used in combinations of 2 or more.

These thermal resistance stabilizers should be used in an amount of 0.001–5 pans by weight with respect to 100 parts by weight of polycarbonate, and preferably 0.005–0.5 parts by weight, with an amount of 0.01–0.3 parts by weight being particularly preferred.

Moreover, the thermal resistance stabilizer may be added in either solid or liquid form.

This thermal stabilizer should preferably be added to [A] the polycarbonate together with [B] and [C] while the polycarbonate is in a molten state, as this makes it possible to manufacture a polycarbonate which has been heated only a few times during manufacturing, and as the polycarbonate pellets obtained contain a thermal stabilizer, one can inhibit thermal decomposition during re-melting.

Moreover, as an epoxy compound, a compound is used which has one or more epoxy groups per molecule. Specific examples include the following:

epoxidized soy bean oil, epoxidized linseed oil, phenyl glycidyl ether, allyl glycidyl ether, t-butylphenyl glycidyl ether, 3,4-epoxyycyclohexylmethyl 3',4'-epoxycyclohexane-carboxylate, 3,4-epoxy-6-methylcyclohexylmethyl 3',4'-epoxy-6'-methylcyclohexane-carboxylate, 2,3-epoxyycyclohexylmethyl 3',4'-epoxycyclohexanecarboxylate, 4-(3,4-epoxy-5-methylcyclohexyl)butyl 3',4'-epoxycyclohexanecarboxylate, 3,4-epoxycyclohexylethylene oxide, cyclohexylmethyl 3,4-epoxycyclohexanecarboxylate, 3,4-epoxy-6-methyl-cyclohexylmethyl 6'-methylcyclohexanecarboxylate, bisphenol A diglycidyl ether, tetra-bromobisphenol A glycidyl ether, diglycidyl ester of phthalic acid, diglycidyl esters of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl 2,2-dimethyl-3,4-epoxycyclohexanecarboxylate, n-butyl 2,2-dimethyl-3,4-epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4-epoxycyclohexanecarboxylate, 2-ethylhexyl 3,'4',-epoxyycyclohexanecarboxylate, 4,6-dimethyl-2,3-epoxycyclohexyl 3',4'-epoxycyclohexanecarboxylate, 4,5-epoxytetrahydrophthalic anhydride, 3-t-butyl-4,5-epoxytetrahydrophthalic anhydride, diethyl 4,5-epoxy-cis-1,2-cyclohexanedicarboxylate, and di-n-butyl 3-t-butyl-4,5-epoxy-cis-1,2-cyclohexanedicarboxylate.

Of the above substances, an alicyclic epoxy compound should preferably be used, with 3,4-epoxycyclohexylmethyl 3',4'-epoxycyclohexanecarboxylate being particularly preferred.

These substances may be also used in combinations of 2 or more.

This type of epoxy compound should be added in the amount of 1–2,000 ppm, and preferably 10–1,000 ppm, with respect to the aforementioned [A] polycarbonate. In particular, when an epoxy compound is used as [D] the additive, one should preferably add the epoxy compound after adding [B] the acidic compound and [C] water in order to neutralize the excess [B] acidic compound. When this [B] acidic compound, which has been added in an excess amount, is neutralized with an epoxy compound, one can obtain polycarbonate which is particularly outstanding in water resistance and transparency.

There are no particular restrictions on the ultraviolet absorber used in the present invention, with an ordinary ultraviolet absorber being suitable, such as a salicylic acid ultraviolet absorber, a benzophenone ultraviolet absorber, a benzotriazole ultraviolet absorber, or a cyanoacrylate ultraviolet absorber.

Specific examples of salicylic acid ultraviolet absorbers include phenyl salicylate and p-t-butylphenyl salicylate.

Examples of benzophenone ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples of benzotriazole ultraviolet absorbers include 2-(2'-hydroxy-5'-methylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4",5",6"-tetrahydrophthalimidomethyl)-5'-methylphenyl] benzotriazole, and 2,2'-methylenebis[4-(1,1,3,3-tetramethylbutyl)-6-(2H-benzotriazol-2-yl)phenol].

Examples of cyanoacrylate ultraviolet absorbers include 2-ethylhexyl 2-cyano-3,3-diphenylacrylate and ethyl 2-cyano-3,3-diphenylacrylate. These substances may also be used in combinations of two or more.

Ultraviolet absorbers are ordinarily used in the amount of 0.001–5 parts by weight with respect to 100 parts by weight of [A] the polycarbonate, and preferably 0.005–10 parts by weight, with the amount of 0.01–0.5 parts by weight being particularly preferred.

Moreover, there are no particular restrictions on mold-releasing agents, with a generally-known mold-releasing agent being suitable.

For example, one may use hydrocarbon mold-releasing agents, including natural and synthetic paraffins, polyethylene waxes, and fluorocarbons, fatty acid mold-releasing agents, including higher fatty acids such as stearic acid and hydroxystearic acid and oxy fatty acids, fatty acid amine mold-releasing agents, including fatty acid aides such as stearamide and ethylene bissteara-mide and alkylene bis-fatty acid amide, alcohol mold-releasing agents, including aliphatic alcohols such as stearyl alcohol and cetyl alcohol, polyvalent alcohols, polyglycol, and polyglycerol, fatty acid ester mold-releasing agents, including fatty acid lower alcohol esters such as butyl stearate and pentaerythritol tetrastearate, fatty acid polyvalent alcohol esters, and fatty acid polyglycol esters, or silicone mold-releasing agents, including silicone oil, and these substances may be used in combinations of two or more.

In the present invention, the mold-releasing agent should ordinarily be used in the amount of 0.001–5 parts by weight, and preferably 0.005–1 parts by weight, with respect to 100 parts by weight of the polycarbonate [A], with an amount of 0.01–0.5 parts by weight being particularly preferred.

The colorant used may be a pigment or a dye. Colorants include inorganic and organic colorants, and either may be used, or a combination of the two may be used.

Specific examples of inorganic colorants include oxides such as titanium dioxide and red iron oxide, hydroxides such as aluminum white, sulfides such as zinc sulfide, selenium, ferrocyanides such as Prussian blue, chromates such as zinc chromate and molybdenum red, sulfates such as barium sulfate, carbonates such as calcium carbonate, silicates such as ultramarine, phosphates such as manganese violet, carbons such as carbon black, and metal powder colorants such as bronze powder and aluminum powder.

Specific examples of organic colorants include nitroso colorants such as naphthol green B, nitro colorants such as naphthol yellow S, azo colorants such as lithol red, Bordeaux 10B, naphthol red, and chromophthal yellow, phthalocyanine colorants such as phthalocyanine blue and fast sky blue, and condensation polycyclic colorants such as indanthrone blue, quinacridone violet, and dioxazine violet.

These colorants are ordinarily used in the amount of $1 \times 10^{-6}$ to 5 parts by weight with respect to 100 parts by weight of [A] the polycarbonate, and preferably $1 \times 10^{-5}$ to 3 parts by weight, with the amount of $1 \times 10^{-5}$ to 1 part by weight being particularly preferred.

Moreover, in the present invention, the above-mentioned [B] acidic compound, [C] water, and [D] additives are added to the polycarbonate [A] in a molten state as described above, but provided that the purpose of the invention is not impaired, these substances [B], [C], and [D] may also be diluted with polycarbonate powder and added to the polycarbonate [A], or one may add master pellets to the polycarbonate [A] which already contain high concentrations of [B], [C], and [D]. In this case, as the water absorbed by the polycarbonate powder or pellets is included, this amount of absorbed water may be subtracted from the above-mentioned [C] water before it is added.

The above method for manufacturing polycarbonate of the present invention makes it possible to efficiently carry out a melt polycondensation reaction in which an aromatic dihydroxy compound and a carbonic acid diester are subjected to a melt polycondensation reaction using a specified catalyst. Accordingly, this makes it possible to efficiently manufacture polycarbonate which shows outstanding initial color-matching properties, has outstanding retention stability during molding such as thermal stability and color-matching stability, and shows outstanding transparency and water resistance.

Moreover, when additives such as acidic compounds are added as necessary to the reaction product when it is in a molten state immediately following the melt polycondensation reaction, the catalyst is stabilized, making it possible to obtain polycarbonate having improved thermal resistance, etc.

Polycarbonate manufactured by the method of the present invention can be favorably used not only in general molded materials, but in construction materials such as sheets, automobile headlight lenses, optical lenses such as glasses, and optical recording media.

In a preferred embodiment of the present invention, (1) an addition compound or a mixture of said addition compound and an aromatic hydroxy compound (in the following, the addition compound or mixture is referred to simply as the addition compound) is formed from an aromatic dihydroxy compound and an aromatic monohydroxy compound, (2) (a) an alkali metal compound and/or an alkaline earth metal compound is added as a catalyst to the addition compound or mixture obtained and then dispersed (or dissolved), (3) the aromatic monohydroxy compound is removed from said addition compound or mixture, and (4) the aromatic dihydroxy compound obtained is subjected to a melt polycondensation reaction, and in the presence of (a) the alkali metal compound and/or alkaline earth metal compound contained in said aromatic dihydroxy compound, the aromatic dihydroxy compound and a carbonic acid diester are subjected to melt polycondensation in order to manufacture the polycarbonate [A].

FIG. 3 shows a process flow diagram of the polycarbonate manufacturing method of this embodiment of the present invention.

In this embodiment, the type of aromatic dihydroxy compound already containing (a) the alkali compound is used, compared to conventional methods in which (a) an alkali compound is directly added to a mixed solution of an aromatic dihydroxy compound and a carbonic acid diester, the production of byproducts which cause discoloration is inhibited from the initial stage of the melt polycondensation reaction between the aromatic dihydroxy compound and the carbonic acid diester, thus making it possible to obtain a polycarbonate having outstanding initial tone immediately after polycondensation.

Moreover, the aforementioned method of manufacturing an aromatic dihydroxy compound by removing the aromatic monohydroxy compound from the addition compound of an aromatic dihydroxy compound and an aromatic monohydroxy compound or a mixture of said addition compound and an aromatic monohydroxy compound is presented in the aforementioned Japanese Laid-Open Patent No. 92-20523.

In the present embodiment of this invention, the aromatic dihydroxy compound and the carbonic acid diester are subjected to melt polycondensation as described above.

(1) In the present embodiment, an addition compound is formed from the aforementioned aromatic dihydroxy compound and the aromatic monohydroxy compound.

As an example of this aromatic dihydroxy compound, bisphenol A may be synthesized from phenol and acetone, but an addition compound should preferably be formed from bisphenol A and phenol.

In forming this type of addition compound, the aromatic dihydroxy compound and aromatic monohydroxy compound may be used in a ratio of 1:1 to form an addition compound containing said aromatic dihydroxy compound and aromatic monohydroxy compound in a 1:1 ratio, or one may use a ratio of 1:1 to 1:50, and preferably 1:1 to 1:25, using the aromatic monohydroxy compound in an excess amount in order to form the mixture of the aforementioned addition compound and the aromatic hydroxy compound.

Both the addition compound and the mixture may be obtained in a solid state.

More specifically, for example, this addition compound may be formed by adding an excess amount of phenol to a reaction mixture containing bisphenol A obtained by dehydration condensation of phenol and acetone in the presence of a cation-exchange resin or an acidic catalyst such as a mineral acid, heating to 70°–180° C. in order to prepare a homogeneous solution, and cooling this solution to 30°–70° C. in order to precipitate a solid. The solid substance (addition compound) obtained in this manner may be washed with phenol.

(2) In the present invention, an (a) alkali metal compound and/or alkaline earth metal compound is next added as a catalyst in a catalytic amount to said addition compound of the aromatic dihydroxy compound and aromatic monohydroxy compound and then dispersed (dissolved).

Preferred specific examples of the (a) alkali metal compound or alkaline earth metal compound (referred to in the following as (a) the alkali compound) include salts of organic acids and bases, salts of inorganic acids and bases, oxides, hydroxides, hydrides, and alcoholates of alkali metals and alkaline earth metals.

The above-mentioned (a) alkali compound may be directly added to the addition compound, it may be added in the form of a salt of or solution in the aromatic dihydroxy compound or aromatic monohydroxy compound, or it may be removed prior to the melt polycondensation process, mixed with a solvent which does not contain residual impurities, and then added.

If the (a) alkali compound is added in the form of a salt of or solution in the aromatic dihydroxy compound or aromatic monohydroxy compound, the dispersion of the catalyst may be increased. Moreover, the amount should preferably be the same as the amount of the (a) alkali compound present in the polycondensation reaction system.

Moreover, the (a) alkali compound may be added to the addition compound in a solid or molten state, and the addition compound may also be made into a solution using a solvent before being added.

(3) In the present invention, the aromatic monohydroxy compound is removed from the addition compound to which a catalyst has been added as described above.

Specifically, heated inert gas is blown into the addition compound, the addition compound is heated at reduced pressure, or these methods are combined and the aromatic monohydroxy compound is removed. The heating temperature of the addition compound or the inert gas should be as low as possible, and in the case of an addition compound of bisphenol A and phenol, for example, it should be 200° C. or less.

Among these various methods, the aromatic monohydroxy compound should preferably be removed in combination with low-temperature heating of the addition compound at reduced pressure or blowing of an inert gas.

The purity of the aromatic dihydroxy compound from which the aromatic monohydroxy compound has been removed in this manner should be 99% by weight or above as measured by high-performance liquid chromatography (HPLC), with purity of 99.5% by weight or above being even more preferable.

In the present embodiment, as a high-purity aromatic dihydroxy compound and a carbonic acid diester are subjected to melt polycondensation, it is possible to obtain a polycarbonate having favorable color-matching properties.

Moreover, the aromatic dihydroxy compound treated in this manner already contains the (a) alkali compound which is the melt polycondensation catalyst. The (a) alkali compound used as a catalyst in the present invention is used in an extremely small amount, but as mentioned above, as it is already thoroughly dispersed in the aromatic dihydroxy compound, the melt polycondensation reaction between the aromatic dihydroxy compound and the carbonic acid diester can be carried out in the presence of a small amount of the uniformly-distributed catalyst.

In manufacturing the polycarbonate, the aforementioned aromatic dihydroxy compound and the carbonic acid diester may be used in a solid state, or they may be subjected to the reaction in a molten state directly from the manufacturing device.

In the present invention, the aforementioned aromatic dihydroxy compound and carbonic acid diester are subjected to melt polycondensation in the presence of (a) an alkali compound catalyst contained in the aromatic dihydroxy compound.

In the present embodiment, a (b) basic compound should preferably be used in combination with the aforementioned (a) alkali compound as the melt polycondensation catalyst.

Accordingly, in the present embodiment, as the melt polycondensation catalyst, one should preferably use a combination of (a) an alkali compound and (b) a nitrogen-containing basic compound, or (a) an alkali compound, (b) a nitrogen-containing basic compound, and (c) boric acid or boric acid ester.

This (b) nitrogen-containing basic compound and (c) boric acid or boric acid ester may be added to the melt polycondensation reaction system (a mixed solution of aromatic dihydroxy compound and carbonic acid diester).

It is preferred to use a combination of (a) an alkali compound and (b) a nitrogen-containing basic compound in the above-mentioned amounts as a catalyst, as this allows the polycondensation reaction to be carried out at a sufficient rate, and high-molecular-weight polycarbonate with a high degree of polymerization can therefore be produced.

In the presence of these catalysts, the polycondensation reaction between the aromatic dihydroxy compound and the carbonic acid diester may be carried out under the same conditions as those conventionally known for polycondensation reactions.

Specifically, in a first stage reaction, the organic dihydroxy compound and the carbonic acid diester are reacted at 80°–250° C., or preferably 100°–230° C., with the temperature range of 120°–190° C. being particularly preferred, for a period of 0–5 hours, or preferably, 0–4 hours, with the period of 0–3 hours being particularly preferred, under normal pressure. Next, the reaction temperature is increased while maintaining the reaction system at reduced pressure, the aromatic dihydroxy compound and carbonic acid diester are reacted, and finally, melt polycondensation of the aromatic dihydroxy compound and the carbonic acid diester is carried out at reduced pressure of 5 mmHg or less, and preferably 1 mmHg or less, at a temperature of 240°–320° C.

The condensation polymerization reaction described above may be carried out continuously or according to the batch method. Moreover, the reaction equipment used in carrying out the above reaction may be of the tank type, the tube type, or the tower type.

The polycarbonate obtained as the reaction product of a reaction conducted as described above ordinarily has an intrinsic viscosity, measured in methylene chloride at 20° C., of 0.10–1.0 dl/g, and preferably 0.30–0.65 dl/g.

As manufacturing of the polycarbonate of the present invention as described above does not use toxic substances such as phosgene and methylene chloride, this method is preferable from an environmental standpoint.

The polycarbonate which is the reaction product obtained as described above (referred to in the following as polycarbonate [A]) shows outstanding color-matching properties in the initial stage.

In the present embodiment, one should preferably add, as described below, [B] a sulfur-containing acidic compound having a pKa value of 3 or below and/or a derivative formed from said acidic compound (referred to below as [B] the acidic compound) immediately after the polycondensation reaction, without cooling the aforementioned [A] polycarbonate obtained as the reaction product.

Moreover, [C] a specified amount of water should preferably be added together with [B] the acidic compound.

According to the above method for manufacturing polycarbonate of the present invention, melt polycondensation of an aromatic dihydroxy compound and a carbonic acid diester can be effectively carried out in such a way that the polycondensation process does not become complex, and a high-purity aromatic dihydroxy compound may be obtained from the initial stage of the reaction. Accordingly, this method may be used to effectively manufacture polycarbonate having outstanding thermal stability, color-matching stability during molding, and outstanding transparency and water resistance.

In another preferred embodiment of the present invention, a catalyst including (a) a nitrogen-containing basic compound is used as the polycondensation catalyst.

For example, one may use a nitrogen-containing basic compound which decomposes readily or is volatile at high temperatures as this (a) nitrogen-containing basic compound, with specific examples including the following compounds:

Ammonium hydroxides having alkyl, aryl, and aryl groups, such as tetramethylammonium hydroxide (Me$_4$NOH), tetraethylammonium hydroxide (Et$_4$NOH), tetrabutylammonium hydroxide (Bu$_4$NOH), and trimethylbenzylammonium hydroxide ($\phi$-CH$_2$(Me)$_3$NOH), etc., tertiary amines such as trimethylamine, triethylamine, dimethylbenzylamine, and triphenylamine, secondary amines indicated by the formula R$_2$NH (in the formula, R indicates an alkyl group such as methyl or ethyl or an aryl group such as phenyl or tolyl), primary amines indicated by the formula RNH$_2$ (in the formula, R has the same meaning as indicated above), pyridines such as 4-dimethylaminopyridine, 4-diethylaminopyridine, and 4-pyrrolidinopyridine, imidazoles such as 2-methylimidazole and 2-phenylimidazole, or basic salts such as ammonia, tetramethylammonium borohydride (Me$_4$NBH$_4$), tetrabutylammonium borohydride (Bu$_4$NBH$_4$), tetrabutylammonium tetraphenylborate (Bu$_4$NBPh$_4$), and tetramethylammonium tetraphenylborate (Me$_4$NBPh$_4$).

Of these substances, tetraalkylammonium hydroxides, particularly tetraalkylammonium hydroxides for electronic use which have a low content of metal impurities, are particularly preferable.

The aforementioned (a) nitrogen-containing basic compound should be included in the amount of $10^{-6}$ to $10^{-1}$ moles, or preferably $10^{-5}$ to $10^{-2}$ moles, with respect to 1 mole of the aromatic dihydroxy compound.

In the present invention, the catalyst is used in the form of a catalyst solution obtained by dissolving or dispersing the aforementioned (a) nitrogen-containing basic compound in a monohydroxy compound or aqueous solution of a monohydroxy compound.

Examples of this monohydroxy compound include aliphatic monohydroxy compounds (alcohols) and aromatic monohydroxy compounds (phenols), etc.

In the present embodiment, this monohydroxy compound should preferably be the same as the monohydroxy compound formed as a by-product of the polycondensation reaction between the aromatic dihydroxy compound and the carbonic acid diester. When it is the same as the monohydroxy compound formed as a by-product of a polycondensation reaction with the monohydroxy compound which forms the catalyst solution, compatibility between the catalyst solution and the mixed solution of the aromatic dihydroxy compound and the carbonic acid diester increases, making it possible to effectively disperse the catalyst ((a) the nitrogen-containing basic compound) in the reaction system and to simplify the process of recovery of unreacted monomers and monohydroxy compounds, etc.

Furthermore, the boiling point of the monohydroxy compound at constant pressure should preferably be equal to or greater than the temperature of the polycondensation reaction between the aromatic dihydroxy compound and the carbonic acid diester.

The monohydroxy compound formed as a by-product of the polycondensation reaction may be estimated based on the kind of carbonic acid diester used in the polycondensation reaction. Accordingly, the monohydroxy compound which forms the catalyst solution can be selected according to the carbonic acid diester used in the polycondensation reaction, and the following are specific examples of monohydroxy compounds which are used.

| Carbonic acid diesters used in polycondensation reaction | Monohydroxy compounds produced as a by-product |
|---|---|
| Diphenyl carbonate | Phenol |
| Ditolyl carbonate | Cresol |
| Bis(chlorophenyl) carbonate | Chlorophenol |
| Dinaphthyl carbonate | Naphthol |
| Bis(diphenyl) carbonate | Cumylphenol [sic] |
| Diethyl carbonate | Ethanol |
| Dimethyl carbonate | Methanol |
| Dibutyl carbonate | Butanol |
| Dicyclohexyl carbonate | Cyclohexanol |

Of these substances, an aromatic monohydroxy compound is preferred, with a phenol being particularly preferred.

There are no particular restrictions on the amount of the aforementioned monohydroxy compound used with respect to (a) the nitrogen-containing basic compound, provided that this amount is not great enough to block the polycondensation reaction, but an amount of 0.5–10,000 moles with respect to 1 mole of (a) the nitrogen-containing basic compound is preferred, and an amount of 1–5,000 moles is particularly preferred.

Moreover, in the present invention, when the monohydroxy compound is water-soluble, it should preferably be used in the form of an aqueous solution of the monohydroxy compound for reasons of ease of operation.

There are no particular restrictions on the amount of water used in this case, provided that this amount does not block the polycondensation reaction, and there are also no particular restrictions on the ratio with respect to the monohydroxy compound, but an amount of 0.5–10,000 moles with respect to 1 mole of (a) the nitrogen-containing basic compound is preferred, with an amount of 1–5,000 moles being particularly preferable.

When (a) the nitrogen-containing basic compound is used in the form of a catalyst solution of a monohydroxy compound in this manner, the catalyst solution is rapidly dispersed in the polycondensation reaction system. Accordingly, compared to conventional methods in which a catalyst is directly added to the polycondensation reaction system of the aromatic dihydroxy compound and the carbonic acid diester or dissolved or dispersed in water or another solvent before being added, the occurrence of side reactions which cause discoloration is prevented from the initial stages of the melt polycondensation reaction, making it possible to obtain polycarbonate which has outstanding initial color tone immediately after polycondensation.

In the present embodiment, a combination of the aforementioned (a) nitrogen-containing basic compound and (b) an alkali metal compound and/or alkaline earth metal compound (abbreviated below as (b) an alkali compound) may be used. Specifically, minute amounts of the (b) alkali compound are present in the raw materials as impurities, and in such cases, the total amount of the (b) alkali compound added as a catalyst and the (b) alkali compound present in the raw materials as an impurity should preferably be the amount specified above.

However, as the amount of the (b) alkali compound present in the raw materials as an impurity varies depending on the raw material used, in order to accurately control the amount of the (b) alkali compound present in the reaction system, it is preferred to purify the raw materials used in order to minimize the amount of the (b) alkali compound present in the raw material. For example, the raw material should preferably be purified and used in the reaction in such a manner that the amount of the (b) alkali compound present in the various components of the raw material is 1 ppb or less as calculated by metal conversion.

In the present embodiment, the (a) nitrogen-containing basic compound used in the above-mentioned polycondensation reaction is used in the form of a catalyst solution of a monohydroxy compound or monohydroxy compound aqueous solution. In cases where the other compounds mentioned above are used together with (a) the nitrogen-containing basic compound as the polycondensation catalyst, it is sufficient if at least the (a) nitrogen-containing basic compound is used as the catalyst solution of the monohydroxy compound or monohydroxy compound aqueous solution. For example, when (a) a nitrogen-containing basic compound and (b) an alkali compound are used in combination as the catalyst, the (a) nitrogen-containing basic compound alone may be dissolved or dispersed in the monohydroxy compound or monohydroxy compound aqueous solution, and (b) the alkali compound may be added directly or in the form of an aqueous solution. Moreover, one may also mix (a) and (b) in advance and then dissolve or disperse them in the monohydroxy compound or monohydroxy compound aqueous solution, and (a) and (b) may be separately dissolved or dispersed in the monohydroxy compound or monohydroxy compound aqueous solution and used individually, or separately dissolved or dispersed catalyst solutions may be mixed and then used.

EXAMPLES

The following is an explanation of the present invention with reference to practical examples, but the invention is not limited to these examples.

In the present specification, the intrinsic viscosity (IV), MFR, color matching [YI], optical transmittance, haze, retention stability, and water resistance of the polycarbonate were measured in the following manner.

[Intrinsic viscosity (IV)]

This was measured in methylene chloride at 20° C. using an Ubbelohde viscosimeter.

This was measured at 300° C. with a load of 1.2 kg according to the JIS K-7210 method.

[Color matching]

An injection-molded plate measuring 3 mm in thickness was molded at a cylinder temperature of 290° C., an injection pressure of 1,000 kg/cm, a cycle time of 45 seconds, and a mold temperature of 100° C., X, Y, and Z values were measured using the ND-1001 DP Colorand color difference meter manufactured by Nihon Denshoku Kogyo K.K. using the transmission method, and yellow index [YI] was measured.

$$YI=100\ (1.277\ X-1.060\ Z)/Y$$

[Optical transmittance]

This was measured according to the ASTM D 1003 method using an injection-molded plate for color matching measurement.

[Haze]

The haze of an injection-molded plate for color matching measurement was measured using an NDH-200 manufactured by Nihon Denshoku Kogyo K.K.

[Retention stability]

After the resin was retained in the cylinder of an injection molding machine for 15 minutes at a temperature of 320° C., injection molding was carried out at this temperature, the molded plate obtained was measured for MFR and color matching (YI), and the rate of increase in MFR compared to MFR in the initial phase was calculated.

[Water resistance]

An injection-molded plate for color matching measurement was immersed in water in an autoclave and then maintained at 125° C. in an oven for 5 days. Haze was then measured using this test piece.

Example 1

0.11 moles of tetramethylammonium hydroxide (2.5× $10^{-4}$ moles/mole of bisphenol A) and 0.00044 moles of sodium hydroxide ($1\times10^{-6}$ moles/mole of bisphenol A) were added as catalysts at 100° C. to 0.46 kilomoles of diphenyl carbonate (manufactured by Enya Co.), and the mixture was agitated.

0.46 kilomoles of this diphenyl carbonate (manufactured by Enya Co.) and 0.44 kilomoles of bisphenol A (manufactured by Nihon G.E. Plastics K.K.) were placed in a 250-l tank-type agitation tank and dissolved at 140° C. after nitrogen substitution.

Next, the temperature was increased to 180° C. and agitation was carried out for 30 minutes.

After this, as the temperature was increased to 210° C., the pressure was gradually decreased to 200 mmHg, and after 30 minutes, the temperature was increased to 240° C. while simultaneously decreasing the pressure to 15 mmHg, the amount of phenol distilled while temperature and pressure were kept constant was measured, and the tank was returned to atmospheric pressure using nitrogen at the moment when no more phenol was distilled. The time required for the reaction was 1 hour. The intrinsic viscosity [IV] of the reaction products obtained was 0.15 dl/g.

Next, these reaction products were pressurized using a gear pump and sent to a centrifuge-type thin-film evaporator, and the reaction was continued. The temperature and pressure of the thin-film evaporator were controlled to 270° C. and 2 mmHg respectively. Using the gear pump, the mixture was sent from the lower portion of the evaporator at a rate of 40 kg/hour into a biaxial horizontal agitation polymerization tank (L/D=3, agitation vane rotation diameter 220 mm, internal volume 80 l) controlled to a temperature of 295° C. and a pressure of 0.2 mmHg, and polymerization was carried out with a retention time of 30 minutes.

After this, with the mixture in a molten state, the polymer was sent using the gear pump into a biaxial extruder (L/D=

17.5, barrel temperature 285° C.), an amount of butyl p-toluenesulfonate greater by a molar factor of 2 than the amount of sodium hydroxide and 100 ppm of distilled water with respect to the resin were kneaded, and the mixture was made into strands by passing through a dye and then cut into pellets using a cutter.

The intrinsic viscosity [IV] of the polymer obtained was 0.49 dl/g.

These results are shown in Table 1.

Example 2

0.44 kilomoles of bisphenol A (Nihon G.E. Plastics K.K.) and 0.46 kilomoles of diphenyl carbonate (manufactured by Enya Co.) were placed in a 250-1 tank-type agitating tank and dissolved at 140° C. following nitrogen purging.

Next, the temperature of the mixture was increased to 180° C., and as a catalyst, a solution of tetramethylammonium hydroxide and diphenyl carbonate mixed at 100° C. to a molar ratio of 2.5:3 0 and a solution of sodium hydroxide and diphenyl carbonate mixed at 100° C. to a molar ratio of 1:300 were mixed and added to a concentration of 0.11 moles of tetramethylammonium hydroxide ($2.5 \times 10^{-4}$ moles/mole of bisphenol A) and 0.00044 moles of sodium hydroxide ($1 \times 10^{-6}$ moles/mole of bisphenol A), and the mixture was agitated for 30 minutes.

After this, pellets were obtained by the same method as in Example 1.

The results are shown in Table 1.

Example 3

A mixture of 0.46 kilomoles of diphenyl carbonate (manufactured by Enya Co.) and 0.44 kilomoles of bisphenol A (manufactured by Nihon G.E. Plastics K.K.) to which 0.00044 moles of sodium hydroxide ($1 \times 10^{-6}$ moles/mole of bisphenol A) had been added in advance as a catalyst at 100° C. and agitated was placed in a 250-1 tank-type agitation tank and dissolved at 140° C. following nitrogen substitution.

Next, the temperature was raised to 180° C., and tetramethylammonium hydroxide was added as is so as to make 0.11 moles ($2.5 \times 10^{-4}$ moles/mole of bisphenol A) and agitated for 30 minutes.

Following this, pellets were obtained by the same method as in Example 1.

The results are shown in Table 1.

Example 4

Pellets were obtained by the same method as in Example 2, except that the types and amounts of carbonic acid diesters shown in Table 1 were used instead of those used in Example 2.

The results are shown in Table 1.

Examples 5–8

Pellets were obtained by the same method as in Example 1, except that the types and amounts of carbonic acid diesters shown in Table 1 were used instead of those used in Example 1.

The results are shown in Table 1.

Comparison Examples 1–5

Pellets were obtained by the same method as in Example 2, except that dissolution of the catalyst in diphenyl carbonate as in Example 2 was not conducted, but the types and amounts shown in Table 1 were added to the reaction system as is.

The results are shown in Table 1.

Example 9

Pellets were obtained by the same method as in Example 1, except for the fact that together with the twofold molar amount of butyl p-toluenesulfonate with respect to sodium hydroxide and the 100 ppm of distilled water with respect to the resin used in Example 1, 300 ppm of tris(2,4-di-t-butylphenyl) phosphite (Mark 2112: manufactured by Adeka Gas) and 300 ppm of 3,4-epoxycyclohexylmethyl 3',4'-epoxycyclohexanecarboxylate (Seloxide 2021P: manufactured by Daicel Chemical Co.) were kneaded in.

The results are shown in Table 1.

Comparison Example 6

Pellets were obtained by the same method as in Comparison Example 1, except for the fact that together with the twofold molar amount of butyl p-toluenesulfonate with respect to sodium hydroxide and the 100 ppm of distilled water with respect to the resin used in Comparison Example 1, 300 ppm of tris(2,4-di-t-butylphenyl) phosphite (Mark 2112: manufactured by Adeka Gas) and 300 ppm of 3,4-epoxycyclohexylmethyl 3',4'-epoxycyclohexanecarboxylate (Seloxide 2021P: manufactured by Daicel Chemical Co.) were kneaded in.

TABLE 1

|  | Example 1 | Example 2 | Example 3 |
|---|---|---|---|
| Catalyst dispersion |  |  |  |
| (a) Alkali compound | NaOH | NaOH | NaOH |
| ($\times 10^{-7}$ moles/BPA) | 10 | 10 | 10 |
| Carbonic acid diester | — | Diphenyl carbonate | — |
| ($\times 10^{-7}$ moles/BPA) | — | 300 | — |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Carbonic acid diester | — | Diphenyl carbonate | — |
| ($\times 10^{-4}$ moles/BPA) | — | 30 | — |
| Addition method | (a) and (b) are added to raw material diphenyl carbonate in advance | Solutions (a) and (b) prepared in advance are added to the reaction system | (a) is added to raw material diphenyl carbonate in advance, (b) is then added to reaction system |

TABLE 1-continued

| [B] Acidic compound<br>Amount used (mole factor/catalyst (a))<br>[C] Water (ppm)<br>Initial-stage properties | butyl<br>p-toluenesulfonate<br>2.0<br>100 | butyl<br>p-toluenesulfonate<br>2.0<br>100 | butyl<br>p-toluenesulfonate<br>2.0<br>100 |
|---|---|---|---|
| [IV] (dl/g) | 0.49 | 0.49 | 0.49 |
| MFR (g/10 minutes) | 10.3 | 10.3 | 10.3 |
| YI | 1.23 | 1.31 | 1.28 |
| Optical transmittance (%) | 90.8 | 90.8 | 90.8 |
| Haze | 0.2 | 0.2 | 0.2 |
| Retention stability | | | |
| MFR (g/10 minutes) | 10.5 | 10.5 | 10.5 |
| MFR increase rate (%) | 2 | 2 | 2 |
| YI | 1.32 | 1.39 | 1.35 |
| Water-resistance Haze | 1.7 | 1.7 | 1.8 |

| | Example 4 | Example 5 | Example 6 |
|---|---|---|---|
| Catalyst dispersion | | | |
| (a) Alkali compound | NaOH | LiOH | KOH |
| ($\times 10^{-7}$ moles/BPA) | 10 | 10 | 10 |
| Carbonic acid diester | Dimethyl carbonate | — | — |
| ($\times 10^{-7}$ moles/BPA) | 300 | | |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Carbonic acid diester | Dimethyl carbonate | — | — |
| ($\times 10^{-4}$ moles/BPA) | 30 | | |
| Addition method | Solutions (a) and (b) prepared in advance are added to the reaction system | (a) and (b) are added to raw material diphenyl carbonate in advance | (a) and (b) are added to raw material diphenyl carbonate in advance |
| 2[B] Acidic compound<br>Amount used (mole factor/catalyst (a))<br>[C] Water (ppm)<br>Initial-stage properties | butyl<br>p-toluenesulfonate<br>2.0<br>100 | butyl<br>p-toluenesulfonate<br>2.0<br>100 | butyl<br>p-toluenesulfonate<br>2.0<br>100 |
| [IV] (dl/g) | 0.49 | 0.49 | 0.49 |
| MFR (g/10 minutes) | 10.3 | 10.3 | 10.3 |
| YI | 1.33 | 1.25 | 1.27 |
| Optical transmittance (%) | 90.8 | 90.8 | 90.8 |
| Haze | 0.2 | 0.2 | 0.2 |
| Retention stability | | | |
| MFR (g/10 minutes) | 10.5 | 10.5 | 10.5 |
| MFR increase rate (%) | 2 | 2 | 2 |
| YI | 1.40 | 1.34 | 1.36 |
| Water-resistance Haze | 1.7 | 1.7 | 1.8 |

| | Comparison Example 1 | Comparison Example 2 | Comparison Example 3 |
|---|---|---|---|
| Catalyst dispersion | | | |
| (a) Alkali compound | NaOH | LiOH | KOH |
| ($\times 10^{-7}$ moles/BPA) | 10 | 10 | 10 |
| Carbonic acid diester | — | — | — |
| ($\times 10^{-7}$ moles/BPA) | | | |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Carbonic acid diester | — | — | — |
| ($\times 10^{-4}$ moles/BPA) | | | |
| Addition method | (a) and (b) are directly added to the reaction system | (a) and (b) are directly added to the reaction system | (a) and (b) are directly added to the reaction system |
| [B] Acidic compound<br>Amount used (mole factor/catalyst (a))<br>[C] Water (ppm)<br>Initial-stage properties | butyl<br>p-toluenesulfonate<br>2.0<br>100 | butyl<br>p-toluenesulfonate<br>2.0<br>100 | butyl<br>p-toluenesulfonate<br>2.0<br>100 |
| [IV] (dl/g) | 0.49 | 0.49 | 0.49 |
| MFR (g/10 minutes) | 10.3 | 10.3 | 10.3 |
| YI | 1.83 | 1.85 | 1.89 |

TABLE 1-continued

|  |  |  |  |
|---|---|---|---|
| Optical transmittance (%) | 90.8 | 90.8 | 90.8 |
| Haze | 0.2 | 0.2 | 0.2 |
| Retention stability |  |  |  |
| MFR (g/10 minutes) | 10.5 | 10.5 | 10.5 |
| MFR increase rate (%) | 2 | 2 | 2 |
| YI | 2.12 | 2.14 | 2.18 |
| Water-resistance Haze | 2.7 | 2.9 | 3.0 |

|  | Example 7 | Comparison Example 4 |
|---|---|---|
| Catalyst dispersion |  |  |
| (a) Alkali compound | NaOH | KOH |
| ($\times 10^{-7}$ moles/BPA) | 5 | 5 |
| Carbonic acid diester | — | — |
| ($\times 10^{-7}$ moles/BPA) |  |  |
| (b) Nitrogen-containing compound | Tetramethylammonium hydroxide | Tetramethylammonium hydroxide |
| ($\times 10^{-4}$ moles/BPA) | 2.5 | 2.5 |
| Carbonic acid diester | — | — |
| ($\times 10^{-4}$ moles/BPA) |  |  |
| Addition method | (a) and (b) are directly added to raw material diphenyl carbonate in advance | (a) and (b) are directly added to the reaction system |
| [B] Acidic compound | butyl p-toluenesulfonate | butyl p-toluenesulfonate |
| Amount used (mole factor/catalyst (a)) | 2.0 | 2.0 |
| [C] Water (ppm) | 100 | 100 |
| Initial-stage properties |  |  |
| [IV] (dl/g) | 0.49 | 0.49 |
| MFR (g/10 minutes) | 10.3 | 10.3 |
| YI | 1.13 | 1.62 |
| Optical transmittance (%) | 90.8 | 90.8 |
| Haze | 0.2 | 0.2 |
| Retention stability |  |  |
| MFR (g/10 minutes) | 10.5 | 10.5 |
| MFR increase rate (%) | 2 | 2 |
| YI | 1.24 | 1.89 |
| Water-resistance Haze | 1.7 | 1.8 |

|  | Example 8 | Comparison Example 5 |
|---|---|---|
| Catalyst dispersion |  |  |
| (a) Alkali compound | NaOH | NaOH |
| ($\times 10^{-7}$ moles/BPA) | 20 | 20 |
| Carbonic acid diester | — | — |
| ($\times 10^{-7}$ moles/BPA) |  |  |
| (b) Nitrogen-containing compound | Tetramethylammonium hydroxide | Tetramethylammonium hydroxide |
| ($\times 10^{-4}$ moles/BPA) | 2.5 | 2.5 |
| Carbonic acid diester | — | — |
| ($\times 10^{-4}$ moles/BPA) |  |  |
| Addition method | (a) and (b) are directly added to raw material diphenyl carbonate in advance | (a) and (b) are directly added to the reaction system |
| [B] Acidic compound | butyl p-toluenesulfonate | butyl p-toluenesulfonate |
| Amount used (mole factor/catalyst (a)) | 2.0 | 2.0 |
| [C] Water(ppm) | 100 | 100 |
| Initial-stage properties |  |  |
| [IV] (dl/g) | 0.49 | 0.49 |
| MFR (g/10 minutes) | 10.3 | 10.3 |
| YI | 1.40 | 2.07 |
| Optical transmittance (%) | 90.8 | 90.8 |
| Haze | 0.2 | 0.2 |
| Retention stability |  |  |
| MFR (g/10 miutes) | 10.8 | 11.1 |
| MFR increase rate (%) | 5 | 8 |
| YI | 1.53 | 2.43 |
| Water-resistance Haze | 2.8 | 3.9 |

TABLE 1-continued

| | Example 9 | Comparison Example 6 |
|---|---|---|
| Catalyst dispersion | | |
| (a) Alkali compound | NaOH | NaOH |
| ($\times 10^{-7}$ moles/BPA) | 10 | 10 |
| Carbonic acid diester | — | — |
| ($\times 10^{-7}$ moles/BPA) | | |
| (b) Nitrogen-containing compound | Tetramethylammonium hydroxide | Tetramethylammonium hydroxide |
| ($\times 10^{-4}$ moles/BPA) | 2.5 | 2.5 |
| Carbonic acid diester | — | — |
| ($\times 10^{-4}$ moles/BPA) | | |
| Addition method | (a) and (b) are added to raw material diphenyl carbonate in advance | (a) and (b) are directly added to the reaction system |
| [B] Acidic compound | butyl p-toluenesulfonate | butyl p-toluenesulfonate |
| Amount used (mole factor/ catalyst (a)) | 2.0 | 2.0 |
| [C] Water (ppm) | 100 | 100 |
| [D] Additives | — | — |
| Phosphorous compound (ppm) | 300 | 300 |
| Epoxycompound (ppm) | 300 | 300 |
| Initial-stage properties | | |
| [IV] (dl/g) | 0.49 | 0.49 |
| MFR (g/10 minutes) | 10.3 | 10.3 |
| YI | 1.13 | 1.61 |
| Optical transmittance (%) | 90.8 | 90.8 |
| Haze | 0.2 | 0.3 |
| Retention stability | | |
| MFR (g/10 minutes) | 10.5 | 11.3 |
| MFR increase rate (%) | 5 | 10 |
| YI | 1.16 | 1.72 |
| Water-resistance Haze | 1.5 | 2.0 |

[Simplified Explanation of the figures]

FIG. 1 shows an example of a catalyst addition method.
FIG. 2 shows an example of a catalyst addition method.

Example 10

Crude bisphenol A was prepared using a cation exchange resin from acetone and phenol.

The crude bisphenol A obtained and phenol were mixed in a 1 to 5 weight ratio, this mixture was heated at 80° C. to make uniform solution, it was then cooled to 42° C., and the precipitated solid was filtered in a nitrogen atmosphere. Next, the filtered solid was washed with molten phenol, and an addition compound of bisphenol A and phenol was obtained in the form of a white solid.

This addition compound is a compound consisting of bisphenol A and phenol bound in a molar ratio of 1:1, but as the phenol in the mixture is present in the excess amount of 0.58 moles with respect to 1 mole of the bisphenol A, the molar ratio of the bisphenol A and phenol in this mixture was 1:1.58.

After sodium hydroxide was added to this addition compound in the amount of $1 \times 10^{-6}$ moles with respect to 1 mole of bisphenol A, it was heated to 180° C. while blowing in nitrogen, and the phenol was removed at a reduced pressure of 50 torr to obtain purified bisphenol A (BPA (1)).

Purity as measured by HPLC was 99.5% by weight or above.

0.44 kilomoles of this BPA (1) and 0.46 kilomoles of diphenylcarbonate (manufactured by Enya Co.) were placed in a 250-l tank-type agitating tank and dissolved at 140° C. following nitrogen purging.

Next, the temperature of the mixture was increased to 180° C., 0.11 moles of tetramethylammonium hydroxide ($2.5 \times 10^{-4}$ moles/mole of bisphenol A) was added as a catalyst, and agitation was carried out for 30 minutes.

After this, as the temperature was increased to 210° C., the pressure was gradually decreased to 200 mmHg, and after 30 minutes, the temperature was increased to 240° C. while simultaneously decreasing the pressure to 15 mmHg, and the amount of phenol distilled while temperature and pressure were kept constant was measured. The reaction was continued until the intrinsic viscosity [IV] of the reaction products obtained reached 0.15 dl/g, and the tank was then returned to atmospheric pressure using nitrogen. The time required for the reaction at 240° C. was 60 minutes.

Next, these reaction products were pressurized using a gear pump, sent to a centrifuge-type thin-film evaporator, and the reaction was continued. The temperature and pressure of the thin-fill evaporator were controlled to 270° C. and 2 mmHg respectively. Using the gear pump, the mixture was sent from the lower portion of the evaporator at a rate of 40 kg/hour into a biaxial horizontal agitation polymerization tank (L/D=3, agitation vane rotation diameter 220 mm, internal volume 80 l) controlled to a temperature of 295° C. and a pressure of 0.2 mmHg and polymerization was carried out with a dwell time of 30 minutes.

Next, with the mixture in a molten state, the polymer was sent using the gear pump into a biaxial extruder (L/D=17.5, barrel temperature 285° C.), and an amount of butyl p-toluenesulfonate greater by a molar factor of 2 than the amount of sodium hydroxide and 100 ppm of distilled water with respect to the resin were kneaded, and the mixture was made into strands by passing through a dye and then cut into pellets using a cutter.

The intrinsic viscosity [IV] of the polymer obtained was 0.49 dl/g.

These results are shown in Table 2.

Comparison Example 7

Pellets were obtained by the same method as in Example 10, except that the addition compound of bisphenol A and phenol obtained in Example 10 was used with the bisphenol A being present in the amount of 0.44 kilomoles, this mixture was placed in a 250-1 tank-type agitating tank together with 0.46 kilomoles of diphenyl carbonate (manufactured by Enya Co.), and after nitrogen purging, it was dissolved at 140° C., the temperature was increased to 180° C., 0.11 moles of tetramethylammonium hydroxide was added as a catalyst ($2.5 \times 10^{-4}$ moles/mole of bisphenol A) and 0.00044 moles of sodium hydroxide ($1 \times 10^{-6}$ moles/mole of bisphenol A), and stirring was carried out for 30 minutes.

The results are shown in Table 2.

Comparison Example 8

Sodium hydroxide was not added to the addition compound of bisphenol A and phenol obtained in Example 10, and after heating to 180° C. while blowing in nitrogen, the phenol was removed at a reduced pressure of 50 torr to obtain purified bisphenol A (BPA (2)). Purity as measured by HPLC was 99.5% by weight or above.

0.44 moles of this BPA (2) and 0.46 kilomoles of diphenyl carbonate (manufactured by Enya Co.) were placed in a 250-1 tank-type agitating tank, and after purging with nitrogen and dissolution at 140° C., the temperature was increased to 180° C., 0.11 moles of tetramethylammonium hydroxide was added as a catalyst ($2.5 \times 10^{-4}$ moles/mol of bisphenol A), 0.00044 moles of sodium hydroxide ($1 \times 10^{-6}$ moles/mol of bisphenol A) was added, and agitation was carried out for 30 minutes. Otherwise, pellets were obtained by the same method as in Example 10.

The results are shown in Table 2.

Examples 11 and 12

Pellets were obtained by the same method as in Example 10, except for the fact that the sodium hydroxide used in Example 10 was used in the amounts shown in Table 2.

The results are shown in Table 2.

Comparison Examples 9 and 10

Pellets were obtained by the same method as in Comparison Example 7, except for the fact that the sodium hydroxide used in Comparison Example 7 was used in the amounts shown in Table 2.

The results are shown in Table 2

Comparison Examples 11 and 12

Pellets were obtained by the same method as in Comparison Example 8, except for the fact that the sodium hydroxide used in Comparison Example 8 was used in the amounts shown in Table 2.

The results are shown in Table 2.

Example 12

Except for the fact that 300 ppm of tris(2,4-di-t-butylphenyl) phosphite (Mark 2112: manufactured by Adeka Gas Co.) and 300 ppm of 3,4-epoxycyclohexylmethyl 3',4'-epoxycyclohexanecarboxylate (Seloxide 2021P: manufactured by Daicel Kagaku Co.) were kneaded in together with an amount of butyl p-toluenesulfonate greater by a molar factor of 2 than the amount of sodium hydroxide and the 100 ppm of water with respect to resin added in Example 10, tablets were obtained by the same method as in Example 10.

The remits are shown in Table 2.

Comparison Example 13

Except for the fact that 300 ppm of tris(2,4-di-t-butylphenyl) phosphite (Mark 2112: manufactured by Adeka Gas Co.) and 300 ppm of 3,4-epoxycyclohexylmethyl 3',4'-epoxycyclohexanecarboxylate (Seloxide 2021P: manufactured by Daicel Kagaku Co.) were kneaded in together with an amount of butyl p-toluenesulfonate greater by a molar factor of 2 than the amount of sodium hydroxide and the 100 ppm of water with respect to resin added in Comparison Example 7, tablets were obtained by the same method as in Comparison Example 7.

The results are shown in Table 2.

Comparison Example 14

Except for the fact that 300 ppm of tris(2,4-di-t-butylphenyl) phosphite (Mark 2112: manufactured by Adeka Gas Co.) and 300 ppm of 3,4-epoxycyclohexylmethyl 3',4'-epoxycyclohexanecarboxylate (Seloxide 2021P: manufactured by Daicel Kagaku Co.) were kneaded in together with an amount of butyl p-toluenesulfonate greater by a molar factor of 2 than the amount of sodium hydroxide and the 100 ppm of water with respect to resin added in Comparison Example 8, tablets were obtained by the same method as in Comparison Example 8.

The results are shown in Table 2.

TABLE 2

|  | Example 10 | Comparison Example 7 | Comparison Example 8 |
|---|---|---|---|
| Aromatic dihydroxy compound | BPA (1) | Addition compound of BPA and phenol | BPA (2) |
| Catalysts |  |  |  |
| (a) Alkali compound | NaOH | NaOH | NaOH |
| Amount used ($\times 10^{-7}$ moles/BPA) | 10 | 10 | 10 |
| Addition method | Added in advance to raw material BPA | Directly added to mixture of addition compound and DPC | Directly added to mixture of BPA and DPC |
| (b) Nitrogen-containing compound | Tetramethylammonium hydroxide | Tetramethylammonium hydroxide | Tetramethylammonium hydroxide |

TABLE 2-continued

|  |  |  |  |
|---|---|---|---|
| Amount used (×10$^{-4}$ moles/BPA) | 2.5 | 2.5 | 2.5 |
| Time required to reach IV of 0.15 dl/g (240° C.) (minutes) | 60 | 80 | 60 |
| [B] Acidic compound | p-butyltoluenesulfonic acid | p-butyltoluenesulfonic acid | p-butyltoluenesulfonic acid |
| Amount used (mole factor/catalyst(a)) | 2.0 | 2.0 | 2.0 |
| [C] Water Amount used (ppm) | 100 | 100 | 100 |
| Initial-stage properties |  |  |  |
| [IV] (dl/g) | 0.49 | 0.49 | 0.49 |
| MFR (g/10 minutes) | 10.3 | 10.3 | 10.3 |
| YI | 1.23 | 1.45 | 1.83 |
| Optical transmittance (%) | 90.8 | 90.8 | 90.8 |
| Haze | 0.2 | 0.2 | 0.2 |
| Retention stability |  |  |  |
| MFR (g/10 minutes) | 10.5 | 10.5 | 10.5 |
| MFR increase rate (%) | 2 | 2 | 2 |
| YI | 1.33 | 1.56 | 2.12 |
| Water-resistance Haze | 1.7 | 2.0 | 2.7 |

|  | Example 11 | Comparison Example 9 | Comparison Example 11 |
|---|---|---|---|
| Aromatic dihydroxy compound | BPA (1) | Addition compound of BPA and phenol | BPA (2) |
| Catalysts |  |  |  |
| (a) Alkali compound | NaOH | NaOH | NaOH |
| Amount used (×10$^{-7}$ moles/BPA) | 5 | 5 | 5 |
| Addition method | Added in advance to raw material BPA | Directly added to mixture of addition compound and DPC | Directly added to mixture of BPA and DPC |
| (b) Nitrogen-containing compound | Tetramethylammonium hydroxide | Tetramethylammonium hydroxide | Tetramethylammonium hydroxide |
| Amount used (×10$^{-4}$ moles/BPA) | 2.5 | 2.5 | 2.5 |
| Time required to reach IV of 0.15 dl/g (240° C.) (minutes) | 65 | 95 | 65 |
| [B] Acidic compound | p-butyltoluenesulfonic acid | p-butyltoluenesulfonic acid | p-butyltoluenesulfonic acid |
| Amount used (mole factor/catalyst (a)) | 2.0 | 2.0 | 2.0 |
| [C] Water Amount used (ppm) | 100 | 100 | 100 |
| Initial-stage properties |  |  |  |
| [IV] (dl/g) | 0.49 | 0.49 | 0.49 |
| MFR (g/10 minutes) | 10.3 | 10.3 | 10.3 |
| YI | 1.13 | 1.36 | 1.62 |
| Optical transmittance (%) | 90.8 | 90.8 | 90.8 |
| Haze | 0.2 | 0.2 | 0.2 |
| Retention stability |  |  |  |
| MFR (g/10 miutes) | 10.5 | 10.5 | 10.5 |
| MFR increase rate (%) | 2 | 2 | 2 |
| YI | 1.21 | 1.48 | 1.89 |
| Water-resistance Haze | 1.2 | 1.5 | 1.8 |

|  | Example 12 | Comparison Example 10 | Comparison Example 12 |
|---|---|---|---|
| Aromatic dihydroxy compound | BPA (1) | Addition compound of BPA and phenol | BPA (2) |
| Catalysts |  |  |  |
| (a) Alkali compound | NaOH | NaOH | NaOH |
| Amount used (×10$^{-7}$ moles/BPA) | 20 | 20 | 20 |
| Addition method | Added in advance to raw material BPA | Directly added to mixture of addition | Directly added to mixture of BPA and DPC |

TABLE 2-continued

| (b) Nitrogen-containing compound | Tetramethylammonium hydroxide | compound and DPC Tetramethylammonium hydroxide | Tetramethylammonium hydroxide |
|---|---|---|---|
| Amount used (×10⁻⁴ moles/DPA) | 2.5 | 2.5 | 2.5 |
| Time required to reach IV of 0.15 dl/g (240° C.) (minutes) | 45 | 70 | 45 |
| [B] Acidic compound | p-butyltoluenesulfonic acid | p-butyltoluenesulfonic acid | p-butyltoluenesulfonic acid |
| Amount used (mole factor/catalyst (a)) | 2.0 | 2.0 | 2.0 |
| [C] Water Amount used (ppm) | 100 | 100 | 100 |
| Initial-stage properties | | | |
| [IV] (dl/g) | 0.49 | 0.49 | 0.49 |
| MFR (g/10 minutes) | 10.3 | 10.3 | 10.3 |
| YI | 1.42 | 1.65 | 2.07 |
| Optical transmittance (%) | 90.8 | 90.8 | 90.7 |
| Haze | 0.2 | 0.2 | 0.3 |
| Retention stability | | | |
| MFR (g/10 minutes) | 10.8 | 10.9 | 11.1 |
| MFR increase rate (%) | 5 | 6 | 8 |
| YI | 1.53 | 1.80 | 2.43 |
| Water-resistance Haze | 2.8 | 3.1 | 3.9 |

| | Example 13 | Comparison Example 13 | Comparison Example 14 |
|---|---|---|---|
| Aromatic dihydroxy compound | BPA (1) | Addition compound of BPA and phenol | BPA (2) |
| Catalysts | | | |
| (a) Alkali compound | NaOH | NaOH | NaOH |
| Amount used (×10⁻⁷ moles/BPA) | 10 | 10 | 10 |
| Addition method | Added in advance to raw material BPA | Directly added to mixture of addition compound and DPC | Directly added to mixture of BPA and DPC |
| (b) Nitrogen-containing compound | Tetramethylammonium hydroxide | Tetramethylammonium hydroxide | Tetramethylammonium hydroxide |
| Amount used (×10⁻⁴ moles/BPA) | 2.5 | 2.5 | 2.5 |
| Time required to reach IV of 0.15 dl/g (240° C.)(min) | 60 | 80 | 60 |
| [B] Acidic compound | p-butyltoluenesulfonic acid | p-butyltoluenesulfonic acid | p-butyltoluenesulfonic acid |
| Amount used (mole factor/catalyst (a)) | 2.0 | 2.0 | 2.0 |
| [C] Water Amount used (ppm) | 100 | 100 | 100 |
| [D] Additives | | | |
| Phosphorus compound (ppm) | 300 | 300 | 300 |
| Epoxy compound (ppm) | 300 | 300 | 300 |
| Time required to reach IV of 0.15 dl/g (240° C.)(min) | 60 | 60 | 60 |
| Initial-stage properties | | | |
| [IV] (dl/g) | 0.49 | 0.49 | 0.49 |
| MFR (g/10 minutes) | 10.3 | 10.3 | 10.3 |
| YI | 1.12 | 1.33 | 1.61 |
| Optical transmittance (%) | 90.8 | 90.8 | 90.8 |
| Haze | 0.3 | 0.3 | 0.3 |
| Retention stability | | | |
| MFR (g/10 minutes) | 10.8 | 11.0 | 11.3 |
| MFR increase rate (%) | 5 | 7 | 10 |
| YI | 1.19 | 1.41 | 1.72 |
| Water-resistance Haze | 1.5 | 1.7 | 2.0 |

DPC: Diphenyl carbonate

Example 14

0.44 kilomoles of bisphenol A (Nihon G.E. Plastics K.K.) and 0.46 kilomoles of diphenyl carbonate (manufactured by Enya Co.) were placed in a 250-l tank-type agitating tank and dissolved at 140° C. following nitrogen purging.

Next, the temperature of the mixture was increased to 180° C., and as a catalyst, a solution of tetramethylammonium hydroxide, phenol, and water in a molar ratio of 2.5:3:20 and a solution of sodium hydroxide, phenol, and water in a molar ratio of 1:10:60 were mixed and added to a concentration of 0.11 moles of tetramethylammonium hydroxide ($2.5 \times 10^{-4}$ moles/mole of bisphenol A) and 0.00044 moles of sodium hydroxide ($1 \times 10^{-6}$ moles/mole of bisphenol A), and the mixture was agitated for 30 minutes.

After this, as the temperature was increased to 210° C., the pressure was gradually decreased to 200 mmHg, and after 30 minutes, the temperature was increased to 240° C. while simultaneously decreasing the pressure to 15 mmHg, the amount of phenol distilled while temperature and pressure were kept constant was measured, and the tank was returned to atmospheric pressure using nitrogen at the moment when no more phenol was distilled. The time required for the reaction was 1 hour. The intrinsic viscosity [IV] of the reaction products obtained was 0.15 dl/g.

Next, these reaction products were pressurized using a gear pump and sent to a centrifuge-type thin-film evaporator, and the reaction was continued. The temperature and pressure of the thin-film evaporator were controlled at 270° C. and 2 mmHg respectively. Using the gear pump, the mixture was sent from the lower portion of the evaporator at a rate of 40 kg/hour into a biaxial horizontal agitation polymerization tank (L/D=3, agitation vane rotation diameter 220 mm, internal volume 80 l) controlled at a temperature of 295° C. and a pressure of 0.2 mmHg, and polymerization was carried out with a dwell time of 30 minutes.

Next, with the mixture in a molten state, the polymer was sent using the gear pump into a biaxial extruder (L/D=17.5, barrel temperature 285° C.), an amount of butyl p-toluenesulfonate greater by a molar factor of 2 than the amount of sodium hydroxide and 100 ppm of distilled water with respect to the resin were kneaded, and the mixture was made into strands by passing through a dye and then cut into pellets using a cutter.

The intrinsic viscosity [IV] of the polymer obtained was 0.49 dl/g.

These results are shown in Table 3.

Comparison Examples 15, 16, 17, 18, 19 and 20

Pellets were obtained by the same method as in Example 14, except that instead of the monohydroxy compound used with respect to the nitrogen-containing basic compound in Example 14, the catalysts, amounts of water, and addition methods shown in Table 3 were used.

The results are shown in Table 3.

Examples 15, 16, 17, 18 and 19

Pellets were obtained by the same method as in Example 14, except for the fact that the catalysts, types and amounts of monohydroxy compounds, amounts of water, and addition methods shown in Table 3 were used.

The results are shown in Table 3.

Example 20

Pellets were obtained by the same method as in Example 14, except for the fact that together with the twofold molar amount of butyl p-toluenesulfonate with respect to sodium hydroxide and the 100 ppm of distilled water with respect to the resin used in Example 14, 300 ppm of tris(2,4-di-t-butylphenyl) phosphite (Mark 2112: manufactured by Adeka Gas) and 300 ppm of 3,4-epoxycyclohexylmethyl 3',4'-epoxycyclohexanecarboxylate (Seloxide 2021P: manufactured by Daicel Chemical Co.) were kneaded in.

The results are shown in Table 3.

Comparison Example 21

Pellets were obtained by the same method as in Comparison Example 15, except for the fact that together with the twofold molar amount of butyl p-toluenesulfonate with respect to sodium hydroxide and the 100 ppm of distilled water with respect to the resin used in Comparison Example 2, 300 ppm of tris(2,4-di-t-butylphenyl) phosphite (Mark 2112: manufactured by Adeka Gas) and 300 ppm of 3,4-epoxycyclohexylmethyl 3',4'-epoxycyclohexanecarboxylate (Seloxide 2021P: manufactured by Daicel Chemical Co.) were kneaded in.

The results are shown in Table 3.

TABLE 3

|  | Example 14 | Example 15 | Comparison Example 15 |
|---|---|---|---|
| Catalyst dispersion |  |  |  |
| (a) Alkali compound | NaOH | NaOH | NaOH |
| ($\times 10^{-7}$ moles/BPA) | 10 | 10 | 10 |
| Monohydroxy compound | Phenol | Phenol | — |
| ($\times 10^{-7}$ moles/BPA) | 100 | 300 | — |
| Water ($\times 10^{-7}$ moles/BPA) | 600 | 2000 | — |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Monohydroxy compound | Phenol | Phenol | Phenol |
| ($\times 10^{-4}$ moles/BPA) | 3.0 | 3.0 | 3.0 |
| Water ($\times 10^{-4}$ moles/BPA) | 20 | 20 | 20 |
| Addition method | Solutions (a) and (b) added after mixing | Solutions (a) and (b) added separately | Solutions (a) and (b) added separately |
| [B] Acidic compound | butyl p-toluenesulfonate | butyl p-toluenesulfonate | butyl p-toluenesulfonate |
| Amount used (mole factor/ catalyst (a)) | 2.0 | 2.0 | 2.0 |
| [C] Water(ppm) | 100 | 100 | 100 |

TABLE 3-continued

| Initial-stage properties | | | |
|---|---|---|---|
| [IV] (dl/g) | 0.49 | 0.49 | 0.49 |
| MFR (g/10 minutes) | 10.3 | 10.3 | 10.3 |
| YI | 1.25 | 1.32 | 1.36 |
| Optical transmittance (%) | 90.8 | 90.8 | 90.8 |
| Haze | 0.2 | 0.2 | 0.2 |
| Retention stability | | | |
| MFR (g/10 minutes) | 10.5 | 10.5 | 10.5 |
| MFR increase rate (%) | 2 | 2 | 2 |
| YI | 1.33 | 1.40 | 1.42 |
| Water-resistance Haze | 1.7 | 1.7 | 1.8 |

| | Example 16 | Comparison Example 16 | Comparison Example 17 |
|---|---|---|---|
| Catalyst dispersion | | | |
| (a) Alkali compound | NaOH | NaOH | NaOH |
| ($\times 10^{-7}$ moles/BPA) | 10 | 10 | 10 |
| Monohydroxy compound | Phenol | — | — |
| ($\times 10^{-7}$ moles/BPA) | 300 | — | — |
| Water ($\times 10^{-7}$ moles/BPA) | — | — | 600 |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Monohydroxy compound | — | — | — |
| ($\times 10^{-4}$ moles/BPA) | — | — | — |
| Water ($\times 10^{-4}$ moles/BPA) | 20 | 20 | 20 |
| Addition method | Solutions (a) and (b) added separately | Solutions (a) and (b) added separately | Solutions (a) and (b) added after mixing |
| [B] Acidic compound | butyl p-toluenesulfonate | butyl p-toluenesulfonate | butyl p-toluenesulfonate |
| Amount used (mole factor/catalyst (a)) | 2.0 | 2.0 | 2.0 |
| [C] Water (ppm) | 100 | 100 | 100 |
| Initial-stage properties | | | |
| [IV] (dl/g) | 0.49 | 0.49 | 0.49 |
| MFR (g/10 minutes) | 10.3 | 10.3 | 10.3 |
| YI | 1.55 | 1.83 | 1.80 |
| Optical transmittance (%) | 90.8 | 90.8 | 90.8 |
| Haze | 0.2 | 0.2 | 0.2 |
| Retention stability | | | |
| MFR (g/10 minutes) | 10.5 | 10.5 | 10.5 |
| MFR increase rate (%) | 2 | 2 | 2 |
| YI | 1.64 | 2.13 | 2.10 |
| Water-resistance Haze | 2.0 | 2.7 | 2.6 |

| | Example 17 | Example 18 | Comparison Example 18 |
|---|---|---|---|
| Catalyst dispersion | | | |
| (a) Alkali compound | NaOH | NaOH | NaOH |
| ($\times 10^{-7}$ moles/BPA) | 5 | 5 | 5 |
| Monohydroxy compound | Phenol | Methanol | — |
| ($\times 10^{-7}$ moles/BPA) | 100 | 100 | — |
| Water ($\times 10^{-7}$ moles/BPA) | 600 | — | — |
| (b) Nitrogen-containing compound | Tetramethylammonium hydroxide | Tetramethylammonium hydroxide | Tetramethylammonium hydroxide |
| ($\times 10^{-4}$ moles/BPA) | 2.5 | 2.5 | 2.5 |
| Monohydroxy compound | Phenol | Methanol | — |
| ($\times 10^{-4}$ moles/BPA) | 3.0 | 20 | — |
| Water ($\times 10^{-4}$ moles/BPA) | 20 | — | 20 |
| Addition method | Solutions (a) and (b) added after mixing | Solutions (a) and (b) added after mixing | Solutions (a) and (b) added after mixing |
| [B] Acidic compound | butyl p-toluenesulfonate | butyl p-toluenesulfonate | butyl p-toluenesulfonate |
| Amount used (mole factor/catalyst (a)) | 2.0 | 2.0 | 2.0 |
| [C] Water (ppm) | 100 | 100 | 100 |
| Initial-stage properties | | | |
| [IV] (dl/g) | 0.49 | 0.49 | 0.49 |
| MFR (g/10 minutes) | 10.3 | 10.3 | 10.3 |
| YI | 1.15 | 1.35 | 1.62 |

TABLE 3-continued

|  | | | |
|---|---|---|---|
| Optical transmittance (%) | 90.8 | 90.8 | 90.8 |
| Haze | 0.2 | 0.2 | 0.2 |
| Retention stability | | | |
| MFR (g/10 minutes) | 10.5 | 10.5 | 10.5 |
| MFR increase rate (%) | 2 | 2 | 2 |
| YI | 1.23 | 1.42 | 1.89 |
| Water-resistance Haze | 1.2 | 1.5 | 1.8 |

| | Example 19 | Example 19 | Comparison Example 20 |
|---|---|---|---|
| Catalyst dispersion | | | |
| (a) Alkali compound | NaOH | NaOH | NaOH |
| ($\times 10^{-7}$ moles/BPA) | 20 | 20 | 100 |
| Monohydroxy compound | Phenol | — | Phenol |
| ($\times 10^{-7}$ moles/BPA) | 200 | — | 1000 |
| Water ($\times 10^{-7}$ moles/BPA) | 1000 | — | — |
| (b) Nitrogen-containing compound | Tetramethylammonium hydroxide | Tetramethylammonium hydroxide | — |
| ($\times 10^{-4}$ moles/BPA) | 2.5 | 2.5 | — |
| Monohydroxy compound | Phenol | — | — |
| ($\times 10^{-4}$ moles/BPA) | 3.0 | — | — |
| Water ($\times 10^{-4}$ moles/BPA) | 20 | 20 | — |
| Addition method | Solutions (a) and (b) added after mixing | (a) and (b) added after mixing | Solution (a) added alone |
| [B] Acidic compound | butyl p-toluenesulfonate | butyl p-toluenesulfonate | butyl p-toluenesulfonate |
| Amount used (mole factor/catalyst (a)) | 2.0 | 2.0 | 2.0 |
| [C] Water (ppm) | 100 | 100 | 100 |
| Initial-stage properties | | | |
| [IV] (dl/g) | 0.49 | 0.49 | 0.49 |
| MFR (g/10 minutes) | 10.3 | 10.3 | 10.3 |
| YI | 1.43 | 2.07 | 2.95 |
| Optical transmittance (%) | 90.8 | 90.7 | 90.6 |
| Haze | 0.2 | 0.3 | 0.4 |
| Retention stability | | | |
| MFR (g/10 minutes) | 10.8 | 11.1 | 12.4 |
| MFR increase rate (%) | 5 | 8 | 20 |
| YI | 1.56 | 2.43 | 3.43 |
| Water-resistance Haze | 2.9 | 3.9 | 50 |

| | Example 20 | Comparison Example 21 |
|---|---|---|
| Catalyst dispersion | | |
| (a) Alkali compound | NaOH | NaOH |
| ($\times 10^{-7}$ moles/BPA) | 10 | 10 |
| Monohydroxy compound | Phenol | — |
| ($\times 10^{-7}$ moles/BPA) | 100 | — |
| Water ($\times 10^{-7}$ moles/BPA) | 600 | — |
| (b) Nitrogen-containing compound | Tetramethylammonium hydroxide | Tetramethylammonium hydroxide |
| ($\times 10^{-4}$ moles/BPA) | 2.5 | 2.5 |
| Monohydroxy compound | Phenol | — |
| ($\times 10^{-4}$ moles/BPA) | 3.0 | — |
| Water ($\times 10^{-4}$ moles/BPA) | 20 | — |
| Addition method | Solutions (a) and (b) added after mixing | (a) and (b) added separately |
| [B] Acidic compound | butyl p-toluenesulfonate | butyl p-toluenesulfonate |
| Amount used (mole factor/catalyst (a)) | 2.0 | 2.0 |
| [C] Water (ppm) | 100 | 100 |
| [D] Additives | — | — |
| Phosphorus compound (ppm) | 300 | 300 |
| Epoxy compound (ppm) | 300 | 300 |
| Initial-stage properties | | |
| [IV] (dl/g) | 0.49 | 0.49 |
| MFR (g/10 minutes) | 10.3 | 10.3 |
| YI | 1.15 | 1.61 |
| Optical transmittance (%) | 90.8 | 90.8 |
| Haze | 0.2 | 0.3 |

TABLE 3-continued

| Retention stability | | |
|---|---|---|
| MFR (g/10 minutes) | 10.8 | 11.3 |
| MFR increase rate (%) | 5 | 10 |
| YI | 1.17 | 1.72 |
| Water-resistance Haze | 1.5 | 2.0 |

We claim:

1. A method for manufacturing polycarbonate by melt polycondensing an aromatic dihydroxy compound and a raw material carbonic acid diester in the presence of a polycondensation catalyst, comprising dissolving or dispersing at least a portion of the catalyst in a carbonic acid diester, a monohydroxy compound or an aqueous solution of a monohydroxy compound, adding the catalyst solution or dispersion to the melt polycondensation reaction system, and melt polycondensing the aromatic dihydroxy compound and the carbonic acid diester.

2. The method of claim 1, wherein the catalyst is dissolved or dispersed in a carbonic acid diester.

3. The method for manufacturing polycarbonate of claim 2, wherein the carbonic acid diester is the raw material carbonic acid diester used in the polycondensation reaction.

4. The method for manufacturing polycarbonate of claim 3, wherein the carbonic acid diester is an aromatic carbonic acid diester.

5. The method for manufacturing polycarbonate of claim 4, wherein the carbonic acid diester which forms the catalyst solution is diphenyl carbonate.

6. The method for manufacturing polycarbonate of claim 1, wherein the catalyst is a basic catalyst.

7. The method for manufacturing polycarbonate of claim 1, wherein, the catalyst is an alkali metal compound or alkaline earth metal compound.

8. The method for manufacturing polycarbonate of claim 1, wherein the catalyst is a nitrogen-containing basic catalyst.

9. The method for manufacturing polycarbonate of claim 1, wherein the catalyst is composed of an alkali metal compound or alkaline earth metal compound and a nitrogen-containing basic compound.

10. The method for manufacturing polycarbonate of claims 7, wherein the alkali metal compound or alkaline earth metal compound is used in the amount of $5 \times 10^{-8}$ to $2 \times 10^{-6}$ moles with respect to 1 mole of the aromatic dihydroxy compound.

11. The method for manufacturing polycarbonate of claim 7, wherein, while the polycarbonate which is a reaction product obtained from melt polycondensation of an aromatic dihydroxy compound and a carbonic acid diester is in a molten state, a sulfur-containing acidic compound having a pKa value of 3 or less or a derivative formed from said acidic compound is added in an amount greater by a molar factor of 1-20 than the catalytic amount of the alkali metal compound or alkaline earth metal compound.

12. The method for manufacturing polycarbonate of claim 7, wherein, while the polycarbonate which is a reaction product obtained from melt polycondensation of an aromatic dihydroxy compound and a carbonic acid diester is in a molten state, water is added in the amount of 5–1000 ppm by weight with respect to the polycarbonate.

13. The method for manufacturing polycarbonate of claim 11, wherein the sulfur-containing acidic compound having a pKa value of 3 or less or derivative formed from said compound is the compound shown in Formula III below:

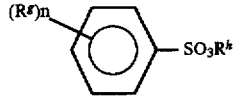

wherein $R^g$ is a hydrocarbon group having 1–50 carbon atoms which may be halogen-substituted, $R^h$ is a hydrogen atom or a hydrocarbon group having 1–50 carbon atoms which may be halogen-substituted, and n is an integer from 0–3.

14. The method of claim 1, wherein the catalyst is a nitrogen-containing basic compound, the nitrogen-containing basic compound is dissolved or dispersed in a monohydroxy compound or an aqueous solution of a monohydroxy compound to form a catalyst solution, the catalyst solution is added to the melt polycondensation reaction system, and the aromatic dihydroxy compound and the carbonic acid diester are melt polycondensed.

15. The method of claim 14, wherein the monohydroxy compound which forms the catalyst solution is produced as a by-product of the polycondensation reaction between the aromatic dihydroxy compound and the carbonic acid diester.

16. The method of claim 15, wherein the monohydroxy compound which forms the catalyst solution is an aromatic monohydroxy compound.

17. The method of claim 16, wherein the monohydroxy compound which forms the catalyst solution is a phenol.

18. The method of claim 14, wherein the nitrogen-containing basic compound is in the amount of $1 \times 10$–6 to $1 \times 10$–1 moles with respect to 1 mole of the aromatic dihydroxy compound.

19. The method of claim 14, wherein the catalyst consists of a nitrogen-containing basic compound and an alkali metal compound or alkaline earth metal compound.

20. An improved method of manufacturing polycarbonate comprising melt polycondensing an aromatic dihydroxy compound and a carbonic acid diester in the presence of a polycondensation catalyst, wherein the improvement comprises forming an addition compound or a mixture of said addition compound and an aromatic hydroxy compound from an aromatic dihydroxy compound and an aromatic monohydroxy compound, adding an alkali metal compound or alkaline earth metal compound as a catalyst in a catalytic amount to the addition compound or mixture, dispersing or dissolving the catalyst in the addition compound or mixture, removing the aromatic monohydroxy compound from the addition compound or mixture, and polycondensing the aromatic dihydroxy compound and the carbonic acid diester melt in the presence of the alkali metal compound or alkaline earth metal compound dissolved or dispersed in said aromatic dihydroxy compound to polycarbonate whereby the initial yellowness index of the polycarbonate is improved by at least 16%.

21. The method of claim 20, wherein, while the polycarbonate is in a molten state, a sulfur-containing acidic compound having a pKa value of 3 or less or a derivative formed from said acidic compound is added in a molar amount greater by a factor of 1–20 than the catalytic amount of the alkali metal compound or alkaline earth metal compound.

22. The method of claim 21, wherein the sulfur-containing acidic compound has the formula

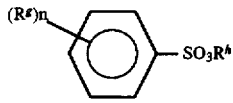

wherein $R^g$ is a hydrocarbon group with 1–50 carbon atoms which may be halogen-substituted, $R^h$ is a hydrogen atom or a hydrocarbon group having 1–50 carbon atoms which may be halogen-substituted, and n is an integer from 0 to 3.

23. The method of claim 21, wherein water is added to the polycarbonate in an amount of 5–1,000 ppm with respect to the polycarbonate.

24. The method of claim 20, wherein the alkali metal compound or alkaline earth metal compound is present in the amount of $5\times10^{-8}$ to $2\times10^{-6}$ moles with respect to 1 mole of the aromatic dihydroxy compound.

25. The method of claim 20, wherein the aromatic dihydroxy compound and the carbonic acid diester are melt polycondensed in the presence of a catalyst comprising the alkali metal compound or alkaline earth metal compound and a nitrogen-containing basic compound.

26. The method of claim 20, wherein the purity of the aromatic dihydroxy compound after removal of the aromatic monohydroxy compound is at least 99% by weight as measured by high-performance liquid chromatography.

* * * * *